United States Patent
Nelson, Jr. et al.

(10) Patent No.: US 9,691,237 B2
(45) Date of Patent: Jun. 27, 2017

(54) NON-VISUAL NAVIGATION FEEDBACK SYSTEM AND METHOD

(71) Applicant: Raven Industries, Inc., Sioux Falls, SD (US)

(72) Inventors: Robert Leonard Nelson, Jr., Austin, TX (US); David Anthony Fowler, Austin, TX (US); Dale L. Gambill, Austin, TX (US); Daniel R. Weber, Austin, TX (US); Charles D. Parker, Columbus, NJ (US); James Darrell McCauley, Cedar Park, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 28 days.

(21) Appl. No.: 14/465,388

(22) Filed: Aug. 21, 2014

(65) Prior Publication Data

US 2015/0097707 A1 Apr. 9, 2015

Related U.S. Application Data

(60) Provisional application No. 61/868,375, filed on Aug. 21, 2013.

(51) Int. Cl.
*G06F 17/00* (2006.01)
*G08B 6/00* (2006.01)
*B60K 35/00* (2006.01)

(52) U.S. Cl.
CPC ............... *G08B 6/00* (2013.01); *B60K 35/00* (2013.01)

(58) Field of Classification Search
CPC .................................................... G08B 6/00
USPC ........ 340/984, 988, 933, 438, 425.5; 701/25
See application file for complete search history.

(56) References Cited

U.S. PATENT DOCUMENTS

| 3,786,571 A | * | 1/1974 | Kelman | G01C 17/26 116/204 |
|---|---|---|---|---|
| 6,925,380 B1 | * | 8/2005 | Harrison, Jr. et al. | 701/209 |
| 2001/0032880 A1 | * | 10/2001 | Levine | B60K 31/00 235/384 |
| 2003/0060971 A1 | * | 3/2003 | Millington | G01C 21/20 701/454 |
| 2003/0128182 A1 | * | 7/2003 | Donath | B60R 1/00 345/156 |

* cited by examiner

*Primary Examiner* — Brent Swarthout
(74) *Attorney, Agent, or Firm* — Schwegman Lundberg & Woessner, P.A.

(57) ABSTRACT

A system for generating a non-visual notification of a machine condition includes a machine condition sensor configured to sense a machine condition. A notification generation controller is in communication with the machine condition sensor. The notification generation controller generates a notification according to the sensed machine condition. In a feedback configuration the notification generation controller compares an integral of a rate of change of the sensed machine condition with a threshold to trigger the generation of a notification. In a guidance configuration the notification generation controller uses the deviation of the machine condition from a guidance direction determined with a steering algorithm to control the generation of a notification. A non-visual notification generator is in communication with the notification generation controller and generates a non-visual notification based on the notification.

6 Claims, 6 Drawing Sheets

NON-VISUAL NAVIGATION FEEDBACK SYSTEM AND METHOD

PRIORITY APPLICATIONS

This application claims the benefit of priority to U.S. Provisional Application Ser. No. 61/868,375, filed on Aug. 21, 2013, the entire contents of which are hereby incorporated in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries; Sioux Falls, S. Dak.; All Rights Reserved.

TECHNICAL FIELD

This document pertains generally, but not by way of limitation, to feedback for machine conditions, navigation guidance or deviation, or the like.

OVERVIEW

Heading indicators on older ships made a clicking noise when the ship turned. As the ship turned, a motor turned a mechanical heading indicator (needle) over a 360-degree range. The motor made a clicking sound every ⅓ of a degree of change in heading. Ship pilots used this unintentional noise as an audible indicator of turning. Auditory feedback meant that they did not have to look at a visual indicator for heading to verify that the helmsman turned as commanded.

This disclosure generates non-visual indication (e.g., sounds, vibrations, or the like) according to measurements conducted a sensor and a circuit (e.g., portable computer, computer, PDA, circuit or the like). The sensor may be a rate of turn device including, but not limited to, a rate of turn sensor, a compass, a gyrocompass, a single GPS receiver, two GPS receivers, a two-antenna GPS receiver or the like. The sounds include, but are not limited to, an audio file or algorithm on a laptop to produce, in examples, clicking, tones or the like at differing rates, pitch or the like. Optionally, haptic feedback (e.g., tactile feedback, such as vibrations, pulses or the like) is provided to the user. The haptic feedback is provided with one or more mechanisms including, but not limited to, a vibration or force application mechanism in a steering implement or the floor of a cabin (e.g., in a steering wheel of a vehicle, such as a ship or a tractor). In a similar manner to audible indications (e.g., clicks, tones or the like) haptic feedback is reproduced at a constant or varied rate, at differing strengths (e.g., varied force) or the like. For instance, either of the audible or haptic indications are provided in a graduated fashion (e.g., at a higher pitch, volume, rate of clicks or sounds, corresponding vibrations or pulses, or the like). By providing the feedback in a graduated fashion additional information is conveyed to the operator beyond, for instance, heading or change in heading. Instead, guidance is actively provided in one example. In such an example, the graduated feedback informs the operator on how rapidly a change in heading is needed to follow a particular course or guide a vehicle to a desired course.

Optionally, two different sounds (or types of haptic feedback) are used, one for turning to port (left) and another for turning to starboard (right). A derivative concept uses stereo (two or more-channel) audio so that listeners sense the direction of turn by different sound parameters (pitch, tone, frequency, a stuttered click in contrast to a click) in each ear. In another example, time delay (e.g. a change in phase) is provided between two or more speakers to audibly locate the sound for the listener and accordingly guide the listener in a desired direction.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
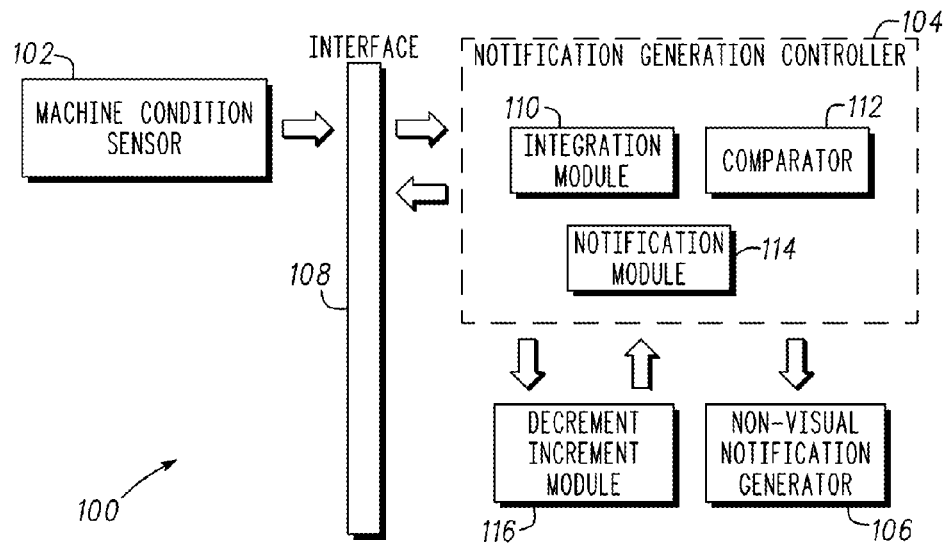
FIG. 1A is a schematic view of one example of a system for generating a non-visual notification of a machine condition.

Traditional gyro-compasses used on ships indicated the ship's heading at a plurality of locations on the ship by driving electro-mechanical heading repeaters. A repeater's compass card commonly showed the heading to a resolution of one-sixth degree. The repeater incidentally commonly made an audible "click" at every one-third degree of heading change. Ship's pilots listened to these clicks as a way of remaining aware of the ship's rate of turn without having to look away from the water ahead nor from any other navigation aids that they may be using.

In at least some examples, modern methods of measuring, displaying, and disseminating heading throughout the ship do not make non-visual indications of a state of a machine (e.g., heading, pitch, yaw, depth, deviation or approach to a heading or path or the like) thus depriving the operator of information that is useful for the piloting of a vehicle such as a marine vehicle, terrestrial vehicle or the like. The present disclosure provides one or more of an auditory or haptic (tactile) sensation indicating changes in one or more machine characteristics including, but not limited to, heading, pitch, yaw, deviation or approach to a desired course or path or the like.

The present disclosure enhances the auditory or haptic information provided with additional information including, but not limited to, the magnitude of change of a machine characteristic, direction of the change (e.g., right or left, up, down or the like). For instance, one or more of pitch or frequency of pulses or clicks, the type of sound or vibration or the like is changed to provide at least two indications (components). In one example, the non-visual indication includes a first component including a notification that a change in the machine characteristic is needed (for guidance) or is occurring (for notification of departure from a heading) shown with the delivery of the audible sound or haptic feedback. In another example, the non-visual indication includes a second component providing one or more of a directional or magnitude based indication. For instance, the notification is provided with a differing sound or vibration to indicate direction (left or right) and a higher pitch, frequency of repetition of the sound (or vibration or pulse) to indicate the magnitude of the notification. In one example, where a significant course correction is needed to merge with a desired path the non-visual indication has a higher pitch or greater frequency of repetition to indicate a tighter turn is warranted. Optionally, the sound or vibration associated with the notification changes according to the direction of the turn (e.g., a stutter click for a left turn and a single click for a right turn). As described herein, a stutter click includes a sound repeated in rapid succession (e.g., two or more times, and optionally overlapping) to differentiate the stutter click from a click. Optionally, the base click replicates the sound of a detent or arm sliding over a feature to generate a short noticeable noise.

This method is applicable to other vehicles, such as an agricultural tractor, and to machines in general. It is also applicable to other variables that a user may advantageously monitor without having to divert attention from other, visual indicators. Other variables (machine conditions or characteristics) include, but are not limited to, course, heading, rotational speed, speed, depth, and displacement (deviation) from a path, roll, pitch, yaw, depth, acceleration and deceleration, cross-track error, pressures, temperature, electrical loading, weight, engine rpms, belt speeds or the like.

The annotated Figures provided herein describe a variety of systems and applications for a system that produces a non-visual alert (feedback) for changes corresponding to a state of a machine. In one example, the state of a machine is a state of a vehicle including, but not limited to, course (change in course), heading (change of heading) or rate of change of course or heading. The systems and methods described herein provide one or more of audible or tactile feedback (haptic) configured to inform an operator or other personnel of the machine with regard to the status of the machine.

The systems, in one example, provide one or more of audible or tactile feedback with regard to a change of heading or direction from a first vehicle heading to a second vehicle heading through measurement of the change during a transition between the headings. In another example, the systems provide one or more of audible or tactile feedback with regard to deviation of a vehicle from a specified heading (or course) or approach to a specified heading (or course), including, but not limited to a specified path in a field or a specified heading in a body of water.

Optionally, the feedback output is provided to the machine, for instance a control surface or feature (e.g., control stick or steering wheel) with a vibrating or pulsing mechanism. In another example, the feedback output is provided with a vibrating or pulsing plate, for instance in the floor of a cab or pilot station. In still another example, the feedback output is generated in an audible manner by one or more speakers associated with the machine or optionally by the sensor itself (the sensor including some sort of audible feature). In another option, the feedback output is provided in a wired or wireless manner (Bluetooth, radio, or the like) through an external device including, but not limited to, a wristwatch, mobile device (phone, PDA or tablet computer), eyeglasses, headphones or headset, or other wearable electronic device. Optionally, the raw data of the sensor is transmitted to the output mechanism and interpreted at the output mechanism, or an intervening processor (e.g., including a comparator module and an updating module) interprets the data and transmits an output signal to the output mechanism.

The operator using the methods and systems provided herein receives feedback on navigation commands or deviation from a desired path or heading without looking away from the windows. Once a guidance command is given to the helmsman (or implemented by a driver), the pilot (or driver) can continue to focus on the channel (or terrain) and not look at a rudder angle indicator or a rate of turn indicator. Instead, the non-visual feedback provides an indication of the change in heading (e.g., from or toward a desired heading) or deviation from or approach to a desired path or other machine condition as described herein.

FIG. 1A shows one example of a non-visual notification system 100. As previously described the methods and systems described herein generate one or more non-visual notifications. In examples, the non-visual notifications are generated to provide feedback indicative of a change in a machine condition. In other examples, feedback is provided for affirmative guidance to change a machine condition to a specified machine condition (e.g., a guidance direction such as a vector). FIG. 1A shows one example of the non-visual notification system 100 used to sense a change in a particular condition and accordingly provide a notification (in the manner of feedback) to the operator in a non-visual manner. Accordingly, the non-visual notification system 100 is used to provide one or more of audible or haptic feedback (e.g., sounds, chimes, clicks, pulses or the like) configured to notify the operator that a condition of the machine has changed.

Referring again to FIG. 1A, the non-visual notification system 100 includes at least one machine condition sensor 102. In an example the machine condition sensor 102 includes one or more of a plurality of differing sensor types. For instance the machine condition sensor 102 includes but is not limited to a rate of change sensor that measures the rate of change of a machine condition including, but not limited to, heading, course, pitch, yaw, depth, roll, speed, pressure, flow rate, application rate or the like. The machine condition sensor 102 of the non-visual notification system 100 in one example measures the heading or course (or rate of change of the same) of a vehicle including, but not limited to, terrestrial, nautical and airborne vehicles. The machine condition sensor 102 in an example measures the condition (e.g., heading or course) and a controller, such as the notification generation control 104, determines the rate of change of the condition. In another example, the machine condition sensor 102 is a rate of change sensor configured to measure the rate of change of the condition. The machine condition sensor 102 includes, but is not limited to, a rate of turn device including, but not limited to, a rate of turn sensor (change of heading or course), a compass, a gyrocompass, a single GPS receiver, two GPS receivers, a two-antenna GPS receiver or the like.

As further shown in FIG. 1A, the machine condition sensor 102 communicates with a notification generation controller 104, for instance by way of an interface 108. In one example the interface 108 includes one or more of a bus, wired connections, wireless communication or the like provided between the machine condition sensor 102 and the notification generation controller 104. As will be described herein the notification generation controller 104 provides one or more of an alert, instruction, notification or the like to a non-visual notification generator 106. The notification generation controller 104 provides the notification to the generator 106 as a result of the measured condition sensed with the machine condition sensor 102 and assessed by the notification generation controller 104.

As further shown in FIG. 1A the non-visual notification generator 106 is in communication with the notification generation controller 104. As will be described herein the non-visual notification generator 106 includes one or more generators including, but not limited to, one or more speakers, one or more vibrating plates or the like configured to provide non-visual notification to an operator. For instance, in one example the non-visual notification generator includes one or more speakers within the cabin of the vehicle configured to provide one or more sounds including sounds having notification characteristics associated with the sounds to provide additional information to the operator with regard to a change in a machine condition (such as heading, course, pressure, speed or the like).

In another example the non-visual notification generator 106 includes a vibrating plate, member or the like associated with a portion of a vehicle cabin including, but not limited to, the floor of the cabin or a steering implement of the vehicle. For instance, a vibration mechanism associated with a feature of the vehicle includes one or more vibratory elements provided within a steering implement such as a steering wheel or levers of a vehicle such as a tractor, car, tank, boat, submersible, aircraft or the like. In another example vibration mechanisms are provided in the cabin of the vehicle for instance a floor of the cabin adjacent to one or more of the feet of the operator. Similar to the audible generators (speakers) described above notification characteristics are optionally included in the output of the vibration mechanisms to provide additional information to the operator, as described herein.

The non-visual notifications provided by the generator 106 provide feedback based on the notifications provided by the notification generation controller 104. The feedback provides confirmation as well as an indication to the operator that a particular machine condition sensed by the machine condition sensor 102 has changed. For instance where a change of course or heading is desired the operator begins changing the machine condition for instance by turning the steering implement (e.g., a wheel) and accordingly receives feedback from the non-visual notification generator 106 according to a signal or alert provided by the notification generation controller 104 that the corresponding condition is changed.

The notification provided by the generators 106 varies according to the generator 106 used with the system 100, and also varies according to the type of notification provided by the generator 106. As will be described herein in one example the change measured by the machine condition sensor 102 is indicated to the operator with one or more repeated or continuous sounds or vibrations delivered by way of the non-visual notification generator 106. In one example the sounds or vibrations are provided in the manner of repeated sounds or repeated vibrations that are provided in as clicks, chimes, repeated audio files, pulses or the like. Repeated notifications are graduated according to a particular resolution desired for the condition changed. For instance, in one example where the machine condition sensor 102 measures the rate of change of heading or course the resolution of change is in one example equivalent to one-third of a degree. Accordingly, with change of the heading or course the notification generation controller 104 cooperates with the non-visual notification generator 106 to provide a plurality of sounds at each according change of one-third of a degree or more of the heading or course. Accordingly, the operator is able to confirm that a course or heading is changed by way of noting (and optionally counting) the generation of the notifications by way of the non-visual notification generator 106.

In another example and as described herein, a notification characteristic is associated with the notification provided by the notification generation controller 104. For instance, a characteristic includes providing one or more additional forms of information such as the direction of a change for instance from left to right (port to starboard). In one example, with a port change of heading or course a characteristic is associated with the notice provided by the notification generation controller 104 and accordingly a differing sound or vibration is provided by the non-visual notification generator 106 that not only indicates the change of a particular condition but also indicates the change in a particular direction such as to the port or left direction. In a similar manner, with the change of a condition in a differing direction, for instance to the starboard or right, the notification generation controller 104 associates a different characteristic with the notification provided to the non-visual notification generator 106. The generator 106 generates differing auditory or haptic feedback to accordingly inform the operator of a change of the machine condition as well as the direction of the change machine condition in the starboard or right direction. Accordingly, with the non-visual notification system 100 described in FIG. 1A the operator receives non-visual feedback regarding a change of a machine condition and in at least one example the feedback includes additional information regarding the change, for instance the direction of the change or the like.

One example of the non-visual notification system 100 integrates a rate of change of a machine condition and accordingly uses the integral of the rate of change to provide non-visual notification including one or more of a continuous or pulsed notification from the generator 106. Integration of the rate of change facilitates the use of the non-visual notification system 100 with heading or course information having a lower quality (e.g., lower resolution) than desired to generate useful notification feedback. For instance, heading measurements on nautical vessels are measured with a resolution of one degree. By integrating the rate of change of the heading (or course) a higher resolution is implemented to accordingly provide non-visual notifications (auditory or haptic) at a uniform rate (e.g., without clustering or bursts of notifications occurring as a result of a lower resolution).

In another example, an analog system is used to measure and to integrate the rate of change. For instance, a capacitor is charged with a current proportional to the rate of change, the capacitor voltage (plus a constant of integration) is proportional to the integral of the rate of change. Optionally, the comparison of the integral to one or more thresholds (described herein) is performed by analog mechanisms.

In another example, a controlled oscillator, such as a voltage-controlled oscillator (VCO) or digitally-controlled oscillator (DCO), controlled by a value representing the measured rate of change, is used to generate non-visual notifications. However, if the sign of the rate of change varies between positive and negative (e.g., for differing directions of change), a controlled oscillator or oscillators designed for a unipolar input may generate erroneous non-visual notifications. Driving one such controlled oscillator with the absolute value of the rate of change, or driving one of two such controlled oscillators with the rate of change when the rate of change is positive and driving the other with the negative of the rate of change when the rate of change is negative and then combining the non-visual notifications from the two controlled oscillators, sacrifices the coherence of the non-visual notifications near transitions of the rate of change from one polarity to the other.

As shown in FIG. 1A the notification generation controller 104 includes a plurality of modules configured to integrate the rate of change of the machine condition measured by the machine condition sensor 102. The controller 104 includes an integration module 110 that integrates the rate of change of the machine condition to generate an instantaneous integral of the rate of change. In one example, where the rate of change is the heading or course of a vehicle the integrated rate of change is equivalent to an instantaneous integral of the rate of change of heading or course.

The instantaneous integral is compared with at least one threshold (and optionally a plurality of thresholds) at the comparator 112. By comparing the instantaneous integral of the rate of change at the comparator 112 with a threshold the notification generation controller 104 determines whether or not a notification module 114 communicates an instruction to the non-visual notification generator 106 to generate non-visual feedback. For instance where the instantaneous integral of the rate of change is greater than the threshold (or less than another threshold) the notification module accordingly generates a notification used by the non-visual notification generator 106 to accordingly generate a notification for the operator. In one example the notification generated is an auditory or haptic notification (feedback) in the form of one or more of clicks, chimes, audio files, pulses or the like. The notification is optionally delivered continuously or repeatedly.

In another example, the notification provided by the notification module 114 (or a composite notification is sent) is then delivered to a decrement increment module 116. Where a notification is provided by the notification module 114 the comparator 112 has determined that the instantaneous integral is greater than (or less than) the threshold, and a non-visual notification is accordingly generated (by the generator 106). The decrement increment module 116 accounts for the provision of the non-visual notification by accordingly changing the value of the instantaneous integral a corresponding value.

In one example, a threshold value is incremented or decremented (added or subtracted) from the instantaneous integral of the rate of change to modify the instantaneous integral (e.g., up or down) according to the comparison conducted at the comparator 112 that triggers generation the (optionally directional) notification. Optionally, the value of the threshold is based on the resolution value of the condition measured, for instance a portion of the resolution value. Where the comparison of the instantaneous integral of the rate of change with a first threshold shows that the instantaneous integral is greater than the first threshold the notification module 114 correspondingly delivers a corresponding instruction to the decrement increment module 116 that decrements (subtracts) a value based on the threshold (and optionally the resolution value) from the instantaneous integral of the rate of change to update the instantaneous integral of the rate of change as the notification of the change in the condition has been provided through the generator 106. Stated another way, once the notification is provided from the non-visual notification generator 106 a repeated notification of that particular change of the condition (by the repeated comparison at the comparator 112) is not needed (and would be inaccurate). Accordingly, that portion of the instantaneous integral of the rate of change is correspondingly subtracted (or added depending on the threshold and comparison of the same) from the overall instantaneous integral.

In another example where the comparator 112 compares the instantaneous integral with another threshold (second threshold) and the instantaneous integral is less than the threshold a notification (different from the notification generated with comparison to the first threshold) is generated by the notification module 114, and the decrement increment module 116 receives a corresponding notification. The instantaneous integral of the rate of change is incremented (increased) according to the delivery of the notification. The second notification (different from the first associated with the comparison to the first threshold) is indicative of a different direction of change (e.g., to the port or left). The notification provided to the decrement increment module 116 accordingly increases the instantaneous integral of the rate of change (e.g., of the heading or course). That is to say, the instantaneous integral is, in this example, raised by the threshold value (optionally based on the resolution value) of the condition measured by the machine condition sensor 102. By raising the instantaneous integral by a value based on the threshold (and optionally the resolution value) the non-visual notification provided by the non-visual notification generator 106 is accordingly generated a single time for a value of the instantaneous integral and not repeatedly generated.

In one example after operation of the decrement increment module 116 the operation of the notification generation controller 104 is repeated with the updated instantaneous integral of the rate of change. That is say, the updated instantaneous integral of the rate of change is compared against one or more thresholds at the comparator 112 to accordingly deliver (or not deliver if the thresholds are not met) a notification from the notification module 114 to the non-visual notification generator 106 and a corresponding notification to the decrement increment module 116 (if a notification is delivered at all).

As previously described in the example above the rate of change has been described with regard to a change in heading or course. In another example the non-visual notification system 100 includes a machine condition sensor 102 configured to measure the rate of change of one or more of heading, course, pitch, yaw, depth, roll, speed, pressure, flow rate (such as an agricultural product application rate or flow rate, seed application rate or the like).

Figure 1B:
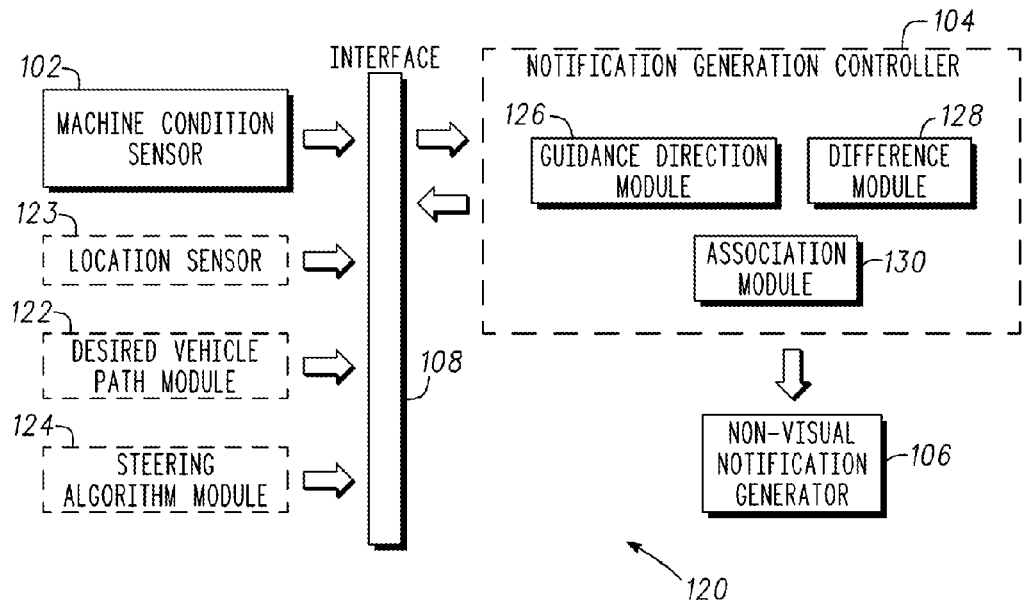
FIG. 1B is a schematic view of another example of a system for generating a non-visual notification of a machine condition.

FIG. 1B shows another example of a non-visual notification system 120. As previously described herein, the non-visual notification systems measure one or more conditions, for instance a rate of change of a condition or the condition itself at the machine condition sensor 102. As shown the machine condition sensor 102 is in communication with a notification generation controller 104 (e.g., by way of the interface 108). The notification generation controller 104 in turn communicates with the non-visual notification generator 106 to generate non-visual notification feedback for the operator. As previously described herein, the non-visual notification generator 106 includes one or more mechanisms including but not limited to auditory or haptic mechanisms configured to generate sounds, vibrations or the like to accordingly inform the operator of a change in a machine condition and in one example provide guidance to facilitate the change of the machine condition toward a desired value of the machine condition.

In the example shown in FIG. 1B the notification generation controller 104 includes a plurality of modules. For instance, the notification generation controller 104 includes a guidance direction module 126, a difference module 128 and an association module 130. In one example the guidance direction module 126 is configured to provide a guidance direction based on the deviation of a machine (e.g., a vehicle) from a desired machine condition. For instance, where a vehicle is displaced (deviated) from a desired vehicle path such as a course, prescribed route or the like the guidance direction module 126 uses a steering algorithm in combination with input (including, but not limited to, one or more of the offset of the vehicle from the desired path, the heading or course of the vehicle relative to the desired path or the like) to accordingly generate a guidance direction for the vehicle. In one example the guidance direction is an instantaneous vector or direction that the vehicle can turn to for instance by way of a change in course or heading to accordingly merge the vehicle with the desired vehicle path based on the characteristics of the steering algorithm used.

The difference module 128 also provided with the notification generation controller 104 determines the difference between the guidance direction determined by the guidance direction module 126 and a current vehicle direction, such as a vehicle direction of travel, to accordingly provide the difference between the vehicle's actual present direction of travel and the desired guidance direction. The difference is communicated to an association module 130 that accordingly associates a notification characteristic with the notification provided to the non-visual notification generator 106. The non-visual notification generator 106 accordingly generates one or more of auditory or haptic feedback (e.g., clicks, chimes, repeated audio files, pulses or the like) that along with the notification characteristic provide an guidance feedback to the operator to change a machine condition (heading or course) to achieve the determined guidance direction. Stated another way, the notification characteristic associated with the notification is provided as a function of the steering algorithm used as well as the deviation of the vehicle from the desired vehicle path (course, heading, preprogramed route or the like). The non-visual notification generator 106 thereby generates a corresponding notification (e.g., with variations in pitch, volume, repetition, audible location, audible phase, tactile force, tactile repetition, tactile location or the like) that provides an indication to the operator of, for instance, direction of a change to heading or course, the speed of the change (urgency) or the like. That is to say, the notification generation controller 104 in combination with the non-visual notification generator 106 provides an affirmative non-visual form of guidance to the operator to allow the operator to change the machine condition to achieve the guidance direction provided by the controller 104. With the non-visual guidance provided by the system 120 (and 100) the operator maintains a view on the terrain ahead while at the same time receiving information from the system 120 to accordingly facilitate change of the condition of the machine to achieve a guidance direction determined by the controller 104 (e.g., to achieve an overall guidance objective for the machine condition such as merging with a desired vehicle path).

One example of guidance is provided with the modules included with the non-visual notification system 120 shown in FIG. 1B. In this example the machine condition measured by the machine condition sensor 102 is heading or course. In another example the machine condition sensor however may measure one or more conditions including, but not limited to, speed, pressure, flow rate, application rate or the like independent of the course or heading of a vehicle.

As shown in FIG. 1B the exemplary system 120 includes an optional desired vehicle path module 122. In one example the desired vehicle path module 122 includes one or more of a field map, prescribed course, headings or the like configured to accordingly provide a path or route for the vehicle to follow. A location sensor 123 is also optionally included with the non-visual notification system 120. In one example the location sensor 123 includes a fiducial such as a GPS antenna that accordingly indexes the location of the vehicle relative to the desired vehicle path provided in the desired vehicle path module 122. Through cooperation of the location sensor 123, the desired vehicle path module 122 and the notification generation controller 104 a deviation of the vehicle, for instance from the desired vehicle path 122, is readily determined. In one example the deviation includes one or more of a lateral offset of the vehicle relative to the desired vehicle path, a track angle error of the vehicle relative to an angle of the vehicle path or the like. In other examples, the deviation of the vehicle includes one or more non-directional characteristics such as speed, application rate for an agricultural product, flow rate of an agricultural product, seed planting rate or the like.

As further shown in FIG. 1B the non-visual notification system 120 further includes an optional steering algorithm module 124. As previously described herein a steering algorithm is used with the deviation of the vehicle, for instance from the desired vehicle path (provided at the desired vehicle path module 122), to accordingly determine a guidance direction by way of the guidance direction module 126 of the notification generation controller 104. In one example the steering algorithm is described herein and is based on the lateral offset of the vehicle relative to the desired vehicle path as well as the track angle error of the vehicle direction of travel relative to the desired vehicle path. In other examples, alternative steering algorithms are readily implemented with the steering algorithm module 124 to accordingly vary the guidance direction provided by the guidance direction module 126. For instance, other inputs including, but not limited to, vehicle speed, a differing aggressiveness with regard to merging of the vehicle relative to the desired vehicle path or the like are used as inputs (varying or static) with the steering algorithm included with the module 124 to accordingly change the guidance direction provided by the guidance direction module 126.

By including the desired vehicle path module 122, the location sensor 123 and the steering algorithm module 124 the notification generation controller 104 is able to readily determine a guidance direction for the vehicle and thereafter determine a change in a condition (such as heading or course) needed to achieve the guidance direction relative to a vehicle direction of travel (a current direction or vector of travel for the vehicle). For instance, the location sensor 123 indexes the present location of a vehicle relative to a desired vehicle path for instance input with the desired vehicle path module 122. In one example, the location provided by the location sensor 123 is used to determine the lateral offset of the vehicle relative to the desired vehicle path. In another example, the machine condition sensor 102 for instance a heading or course sensor (a gyro compass, plurality of gyro compasses or the like) is used to measure the vehicle direction of travel (such as a present course or heading of the vehicle). The measured course or heading of the vehicle is used along with the lateral offset of the vehicle and the steering algorithm (from module 124) to determine a guidance direction for the vehicle with the guidance direction module 126 to merge the vehicle with a desired vehicle path in a manner based on the steering algorithm. The guidance direction provided by the guidance direction module 126 is used by the difference module 128 to accordingly find a difference between the guidance direction (a vector, angle or the like) and the vehicle direction of travel to determine a change in the machine condition such as course or heading needed to achieve the determined guidance direction.

The difference module 128 conveys the determined difference to the association module 130. The association module determines notification characteristics corresponding to the difference and submits that as part of the notification to the non-visual notification generator 106. The notification generator 106 in turn generates one or more of auditory or haptic guidance feedback (e.g., a sound, vibration or the like) to the operator that facilitates the change of the machine condition to the guidance direction determined by the guidance direction module 126 of the notification generation controller 104.

The non-visual notification system 120 repeats this operation as the vehicle moves along a path to merge with the desired vehicle path. The location (and deviation) of the vehicle relative to the desired vehicle path are determined again by the sensors (location sensor 123 and machine condition sensor 102) to provide updated guidance directions 126 according to changing vehicle directions of travel, lateral offset locations relative to the desired vehicle path and the like. Accordingly a continuous or near-continuous notification (varying based on changes in the notification characteristic) is provided to the operator to facilitate the guidance (according to the steering algorithm used) of the vehicle to merge the vehicle to the desired vehicle path 122.

Figure 2:
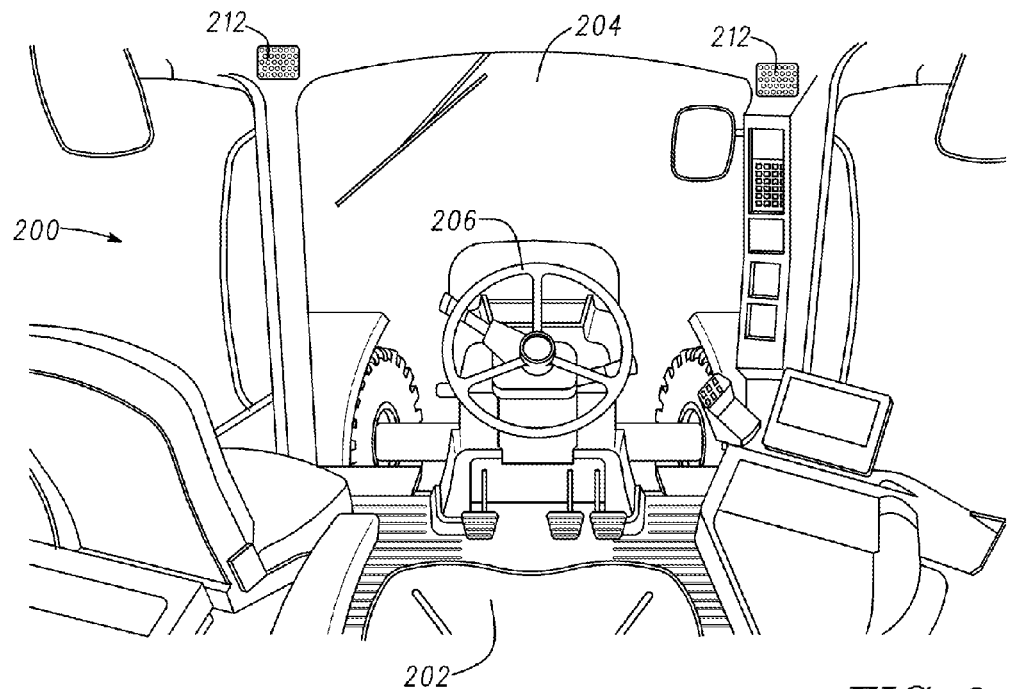
FIG. 2 is one example of an audio based non-visual notification generator installed in a vehicle cabin.

FIG. 2 shows one example of a vehicle cabin 200 including one or more non-visual notification generators therein. As shown the vehicle cabin 200 includes an operator seat 202 positioned within the cabin and a steering implement 206 provided in front of the operator seat 202. A view port 204, such as a windshield or the like, is provided in front of the steering implement 206 (with optional side view ports) to accordingly allow the operator to see the exterior of the vehicle and facilitate the operation by way of the steering implement 206.

In the example shown in FIG. 2, the non-visual notification generator includes one or more speakers, such as the speakers 210, 212. A plurality of speakers 210, 212 are shown in FIG. 2 in the vehicle cabin 200. For instance, as shown the speaker 210 is coupled with a left strut of the cabin 200 while the speaker 212 is coupled with the right strut. In another example, the vehicle cabin 200 includes a single speaker, for instance a speaker installed in substantially any location within the vehicle cabin 200. In another example, a plurality of speakers is installed at varying positions around the vehicle cabin 200.

As previously described herein, the audible sound generators (e.g., speakers 210, 212) are configured to generate non-visual notifications such as a sound (or sounds) that are accordingly used to provide feedback to an operator for instance as a machine condition (including, but not limited to, heading, course, pitch, yaw, depth, roll, speed, pressure, flow rate, application rate or the like) are changed. In another example the non-visual notification generator such as the speakers 210, 212 provide guidance feedback to the operator including guidance feedback toward a desired configuration or condition for the machine. As previously described and shown in FIG. 1B, in one example, the non-visual notification system 120 is configured to provide guidance feedback to the operator corresponding to a difference value between a vehicle direction of travel and a guidance direction. The guidance feedback is provided by way of a (varying) notification characteristic with the non-visual notification provided by the speakers 210, 212.

In one example the notification provided by the speakers 210, 212 is a repeated sound such as a click, audio file such as a chime, ping or the like that is repeated based on the change of the machine condition (e.g., the heading or course of the vehicle). For instance, if the vehicle heading or course changes whether by affirmative manipulation of the steering implement 206 or drifting of the vehicle (e.g., by unintentional heading or course changes) a corresponding sound such as a ping, chime or click is provided by the speakers 210, 212 to accordingly notify the operator of a change in the machine condition. As described herein, the notification is optionally provided according to a comparison of an instantaneous integral with a threshold. Accordingly, the notification is provided as the integral exceeds (or falls below) the threshold, and may be repeated to indicate additional change of the machine condition. In another option, the threshold is based on a resolution value such as a ⅓ of a degree per instance of notification, and the notification correspondingly indicates a recognized degree of change, for instance a ⅓ of a degree per click or the like. The operator may then count clicks, repeated sounds, chimes or the like to accordingly determine a relative magnitude of the change of the condition.

In another example, the speakers 210, 212 provide separate sounds to provide an indication of direction of change. For instance, the left speaker 210 provides a corresponding sound (click, chime, ping or the like) as the heading or course of the vehicle changes to the left or port. In a similar manner, the right speaker 212 provides the sound (a chime, click, ping or the like) as the vehicle changes heading or course to the right or starboard.

In still another, example the speakers 210, 212 (or a single speaker or three or more speakers) provide an identical sound such as a click, chime or ping that is varied across each of the speakers 210, 212 to provide an indication of a different direction or other characteristic of the machine condition change. For instance, as the vehicle turns to the left (or port) the speakers 210, 212 provide a double chime, double or stutter click, double ping or the like. In another example as the vehicle turns to the right (or starboard) the speakers 210, 212 provide a different sound for instance a single click, a single ping or a single chime to indicate to the user that the machine has turned to the right or starboard relative to an initial heading or course. A change in the generated sound is one example of a varied notification characteristic that is attached to a base sound as previously described herein. Other examples of notification characteristics include, but are not limited to, one or more varying audible pitch, audible volume, audible repetition (for instance a double click, triple click or the like), audible location, audible phase of the sound or the like. By using one or more of these characteristics (and varying the characteristic) information regarding changes of the machine condition, for instance of heading or course, are provided to the operator without requiring the operator to divert his eyes from the terrain ahead (e.g., to look at a view screen including a map, orientation of the vehicle relative to the map or the like). Instead the operator continue to maintain the view through the view port 204 while at the same time affirmatively steering through the steering implement 206 and recognizing, by way of the non-visual notification generator speakers 210, 212, that a condition of the vehicle for instance its heading or course has changed.

Figure 3A:
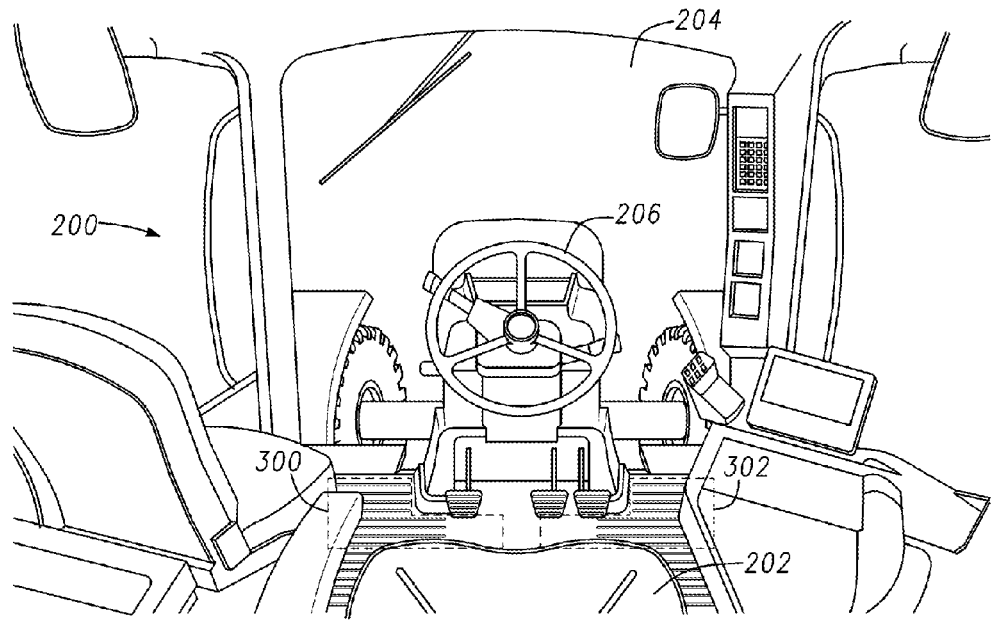
FIG. 3A is one example of a vibratory based non-visual notification generator installed in a vehicle steering device.

FIG. 3A shows the vehicle cabin 200 including another example of a non-visual notification generator. In this example, the non-visual notification generator includes one or more vibration mechanisms, such as the vibrating plates 300, 302 associated with the floor of the cabin. As shown the vibrating plates 300, 302 are provided near the foot rest of the operator when seated in the operator seat 202.

In a similar manner to the speakers 210, 212 the vibrating plates 300, 302 are used in one example in combination to provide an identical notification (vibration) to notify the operator of a change in course or heading (e.g., by way of an affirmative movement of the steering implement 206 or drift of the vehicle caused by relaxation of control of the steering implement by the operator). In another example, the vibrating plates 300, 302 are configured to provide varied vibrations for instance vibrations having different frequency, pattern or repetition or the like to indicate to the operator a direction of the change of condition, for instance to the right or the left.

As described herein, the vibration notification is optionally provided according to a comparison of an instantaneous integral with a threshold. Accordingly, the vibration notification is provided as the integral exceeds (or falls below) the threshold, and may be repeated to indicate additional change of the machine condition. In another option, the threshold is based on a resolution value such as a ⅓ of a degree per instance of notification, and the notification correspondingly indicates a recognized degree of change, for instance a ⅓ of a degree per vibratory pulse or the like. The operator may then count repeated pulses to accordingly determine a relative magnitude of the change of the condition.

In still other examples, the vibrating plates 300, 302 provide differing output. For instance, a vibration is only provided through the right vibrating plate 302 as the vehicle 200 moves from an initial course and turns right to thereby informing the operator that the vehicle has changed heading or course to the right (or starboard). Conversely with vibrations provided through the left vibrating plate 300 indicate to the operator that the vehicle has changed course or heading to the left (or port).

Optionally other characteristics of the vibration provided by the vibrating plates 300, 302 (either together or separately) are altered to provide affirmative guidance of the machine, for instance toward a desired condition such as a guidance direction. For instance, the notifications provided by the vibrating plates 300, 302 are varied according to variation of one or more of tactile force, tactile repetition or tactile location transmitted through the vibrating plates 300, 302. In one example, the variation of strength (force) of the vibrations or their repetition indicates one or more of a direction of change as described herein, an indicated urgency for a change (e.g., how quickly or what magnitude of a turn should be implemented).

In another example, the vibrating plates 300, 302 are each separated into one or more zones to accordingly provide corresponding locations for the vibration in one or more of the zones of each of the vibrating plates 300, 302 to provide further additional location information for the notifications. For instance, where the notifications are provided for guidance feedback, if vibrations are provided at the very left most part of the left vibrating plate 300 the operator recognizes that the steering implement 206 (and accordingly the vehicle) should be turned at a tighter angle. Similarly with a vibration provided by an inner zone of the right vibrating plate 302 the operator recognizes that a more gentle turn to the right is necessary to guide the vehicle toward a determined guidance direction provided by the system 120.

Figure 3B:
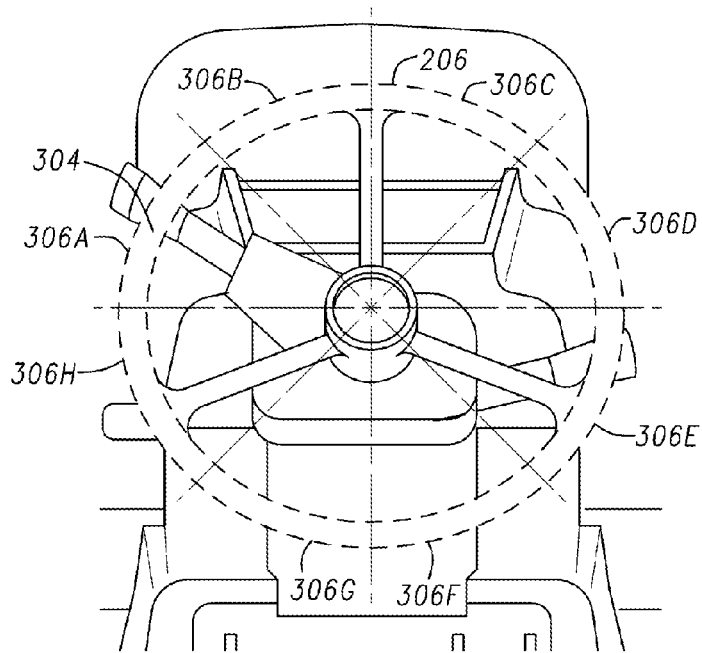
FIG. 3B is another example of a vibratory based non-visual notification generator installed in a vehicle cabin.

FIG. 3B shows another example of a vibrating mechanism 304 associated with the steering implement 206. In this example, the vibrating mechanism 304 is provided within an exemplary wheel as the steering implement 206 and accordingly transmits its vibrations to the hands of the operator as the operator handles the steering implement 206. In another example, the steering implement 206 includes but is not limited to another control implement such as a valve controller, application controller, lever or the like. The vibrating mechanism 304 provides a non-visual notification (e.g., haptic or tactile feedback) to the operator for the particular implement (whether steering, control or the like) to allow the operator to receive feedback with regard to changes in the condition of a machine and optionally to affirmatively provide instructions to the operator to change the condition of the machine to achieve a desired guidance direction.

In the example shown in FIG. 3B the vibration mechanism 304 optionally includes a plurality of zones 306A-H. In the example shown in FIG. 3B the zones are provided at differing subdivisions or quadrants of the steering implement 206. Accordingly, as the steering implement 206 such as a wheel is rotated within the vehicle cabin 200 vibrations (pulses) are located at a particular location or zone 306A-H along the steering implement 206. For instance where a non-visual notification indicating a change of condition (e.g., heading or course) to the left is provided one of the zones or a plurality of zones presently provided at the left portion of the steering implement 206 are accordingly pulsed to provide an indication of the change to the operator. Similarly, with a conditional change to the right (a heading or course change to the right) the zones presently at the right portion of the steering implement 206 are operated to provide feedback of the change to the right. In one example a controller is associated with the vibrating mechanism 304 including the zones 306A-H and the controller senses the zones presently located to the left or right depending on rotation of the wheel and designates the particular zones for operation. That is to say, the zones presently located at the right or left are operated (vibrated) according to the non-visual notifications generated (e.g., by the systems 100, 120). By associating notifications to the respective zones of zones 306A-H presently located to the right or left accurate delivery of the non-visual notifications to the respective right or left sides of the steering implement 206 is ensured.

Figure 4:
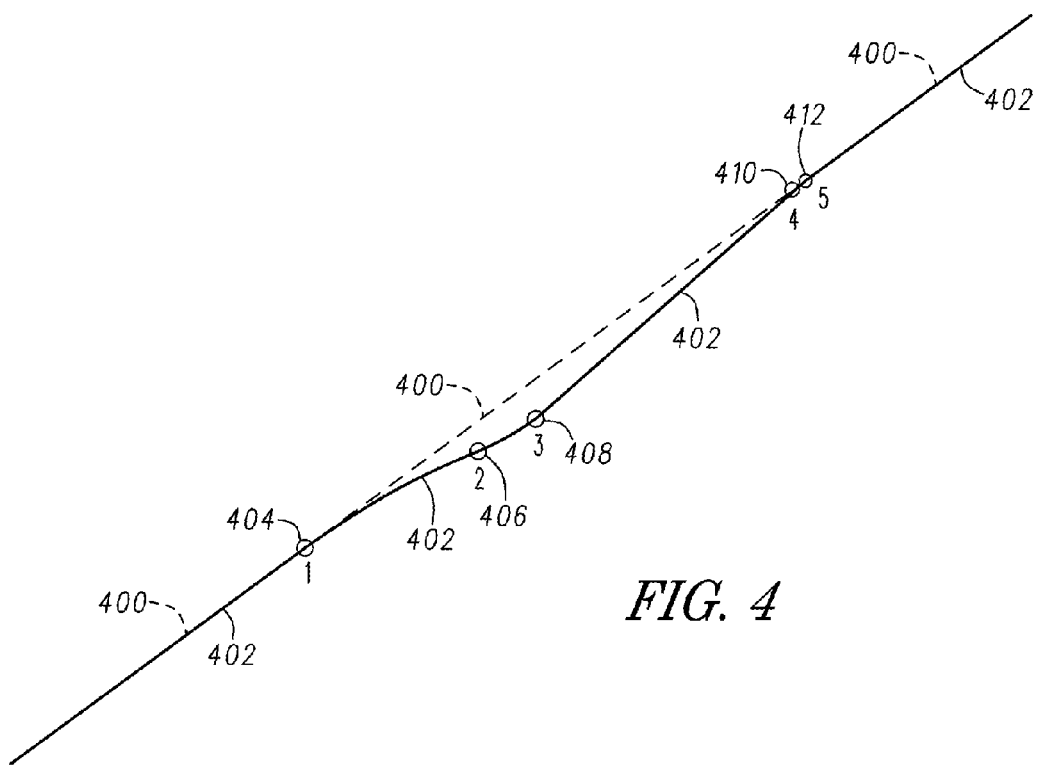
FIG. 4 is a schematic view of one example of a vehicle track deviating from and returning to a desired vehicle path according to non-visual notification feedback.

FIG. 4 shows one example of a path 400 for instance the path of a vehicle across terrain such as a body of water, a field or the like. In the example the path 400 shows a linear path for a vehicle such as a nautical, airborne or terrestrial vehicle. In another example, the path 400 has a nonlinear (e.g., curved) configuration. In describing the systems 100, 120 and non-visual notifications provided herein discussion of a path is not limited to a linear path but also includes nonlinear paths both for a desired vehicle path, the actual vehicle direction of travel over time and guidance directions for a vehicle (e.g., to merge with the desired vehicle path).

Referring again to FIG. 4, a vehicle path 402 is shown coextensively at least in part with the path 400. The vehicle path 402 shows an exemplary route a vehicle takes relative to the path 400. As shown in FIG. 4, the vehicle path 402 deviates from the path 400. As further shown, the vehicle path 402 includes a plurality of numbered points (1-5) provided to indicate an exemplary first change in direction of the vehicle (deviation), a second change in direction (change in a machine condition such as course or heading to turn toward the path 400), and a third change in direction (a return to the direction of the path 400). A deviation 404 of the vehicle is shown at location 1 in FIG. 4. The vehicle deviates (changes heading or course) from the path 400 and the vehicle path 402 in turn turns toward the right (starboard) relative to the path 400. As further shown in FIG. 4 the vehicle path 402 continues right relative to the path 400 until location 2 corresponding to the beginning of a direction change 406. The direction change continues along the vehicle path 402 until reaching the third location (location 3) corresponding to the completion of the direction change 408. Between locations 2 and 3 the vehicle is turned for instance to the left (port) to guide the vehicle back toward the path 400. The vehicle then continues along the vehicle path 402 toward the path 400 until reaching location 4. At location 4 the vehicle is turned again (for instance to the right or starboard) at the beginning of a direction return 410. The turn is completed at a completion of the direction return 412 at point 5 and the operator turns the vehicle onto the path 400 (e.g., onto a previous course). Accordingly after the changes in direction shown in FIG. 4 the vehicle is returned to the path 400 and accordingly the vehicle path 402 and the path 400 are coincident as the vehicle proceeds on.

The non-visual notification systems described herein, for instance the system 100 shown in FIG. 1A, provides non-visual feedback to an operator of a machine such as a vehicle to accordingly indicate deviation or change of a machine condition relative to an initial condition. That is to say, the non-visual notifications as previously described herein are used for instance by the operator to note a deviation from a machine condition and accordingly allow the operator to also receive feedback regarding a change such as a change of direction of the vehicle back toward a machine condition (such as a heading or course along the path 400 in FIG. 4).

For instance, in one example the non-visual notification system 100 provides notification in the form of one or more of auditory or haptic feedback (e.g., chimes, clicks, audio files, vibrations or the like) by way of the non-visual notification generator 106 as the vehicle deviates at the deviation 404. For instance, where the operator has released or relaxed control over a steering implement, the vehicle drifts off course as shown by the deviation 404. As the machine condition (such as course or heading) changes the machine condition sensor 102 measures a change in the machine condition and the non-visual notification generator 106 in combination with the notification module 114 accordingly generates feedback, such as a non-visual notification (a click, chime, vibration or the like) to indicate the machine (in this example a vehicle) has changed course or heading.

Similarly, where guidance toward another condition is desired the operator is able to turn the steering implement to accordingly guide the vehicle in an opposed direction for instance (as shown in FIG. 4) from the right to the left (port) as provided between points 2 and 3 corresponding to the beginning of the direction change 406 and the completion of the direction change 408. As the course correction is applied, for instance by turning of the steering implement, the machine condition sensor 102 measures the machine condition (e.g., a rate of change of the condition) and the notification generation controller 104 correspondingly uses the rate of change to generate a notification by way of the notification module 114 and the non-visual notification generator 106. Accordingly, as the operator changes the condition of the machine (by turning the vehicle) between points 3 and 4 one or more clicks, chimes or the like are generated by the non-visual notification generator 106 to accordingly provide feedback to the operator that a change, in this case a change in heading or course, is occurring on the vehicle.

In another example, a notification characteristic is provided with the non-visual notification from the non-visual notification generator 106 to provide an indication of direction of the change of the condition, for instance toward the left or right. As shown in FIG. 4, the direction of change differs between locations 2 to 3 and 4 to 5 (port and starboard, respectively). As described herein, the notifications provided for each of these changes is optionally varied to provide an indication of the direction of change to the operator. For instance, a double click (stutter click) is provided for each notification of a change of heading or course to port (e.g., from 2 to 3) and a single click is provided for each notification of a change of heading or course to starboard (e.g., from 4 to 5).

Optionally, the non-visual notification provided by the non-visual notification generator 106 is provided at a specified increment based on a threshold compared with the instantaneous integral of the rate of change of the measured condition. In one example, the threshold corresponds to a resolution value for the condition measured. For instance each click, chime, sound, vibration pulse or the like is provided by the non-visual notification generator 106 according to an increment of a degree as the resolution value, for instance one-third of a degree. When the non-visual notifications are generated according to a threshold that is based on a resolution value the operator may count the number of repetitions of the notification (auditory or haptic feedback) to readily determine the vehicle has turned a number of degrees or portion of a degree (corresponding to the threshold as it relates to the resolution value).

For instance where the path 400 is at 40 degrees relative to a 45 degree path provided between locations 3 and 4 the operator knows to turn the vehicle for instance five degrees to the right (or starboard) to align with the path 400. The operator turns the vehicle and then listens (or feels in the case of haptic feedback) for non-visual notifications (e.g., chimes, clicks or the like including for instance a directional notification characteristic) to accordingly count out a number of clicks corresponding to the five degrees needed to change the vehicle course from the approximated 45 degrees provided between points 3 and 4 to the desired 40 degrees along the path 400. At the completion of the direction return 412 the operator confirms by way of a number of non-visual notifications provided by the generator 106 (e.g., 15 clicks with a resolution of one third of a degree) that the vehicle is aligned with the path 400. As the machine drifts from the path 400 one or more corresponding notifications are provided by the non-visual notification generator 106. The method shown in FIG. 4 and previously described herein is thereafter repeated to accordingly facilitate the use of feedback to guide the vehicle back toward the desired path 400.

Figure 5:
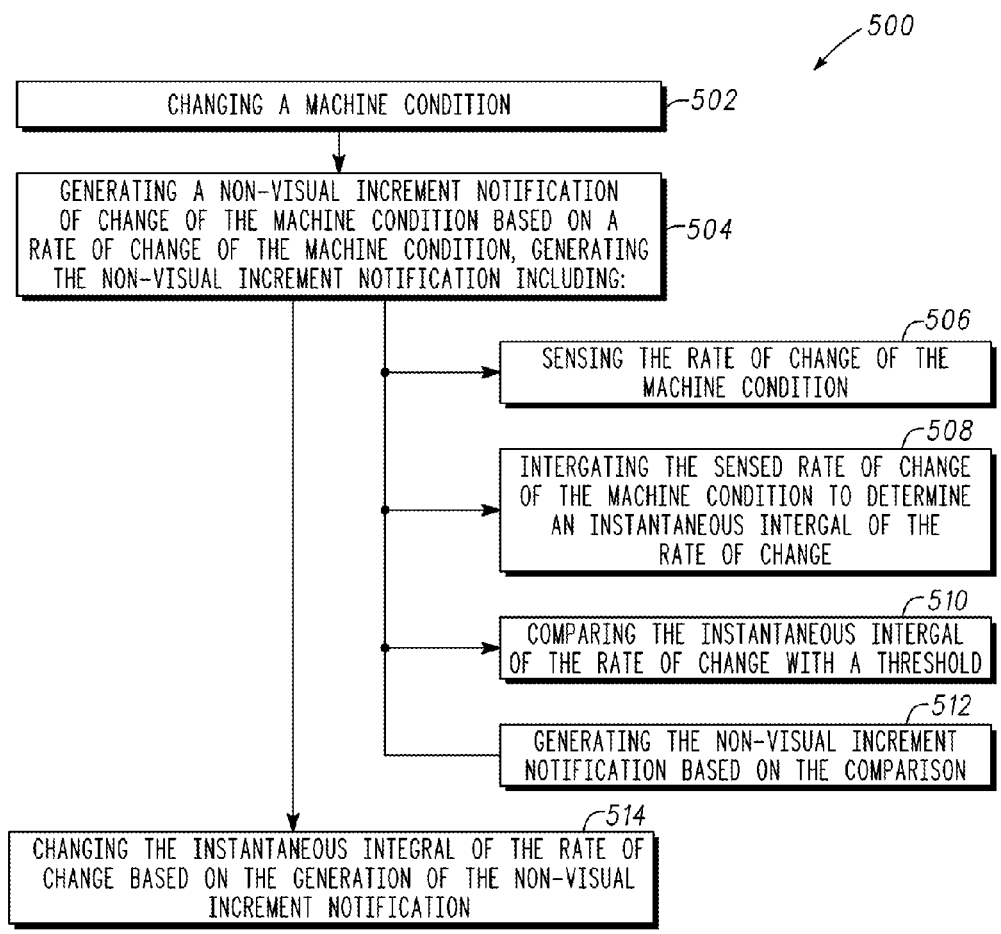
FIG. 5 is a block diagram showing one example of a method for non-visually indicating a change in a machine condition.

One example of a method for non-visually indicating a change in a machine condition is shown by the method 500 described herein and shown for instance in FIG. 5. In describing the method 500 reference is made to one or more components, features, functions and steps previously described herein. Where convenient, reference is made to the components, features, steps and the like with reference numerals. Reference numerals provided are exemplary and are nonexclusive. For instance, features, components, functions, steps and the like described in the method 500 include but are not limited to the corresponding numbered elements provided herein. Other corresponding features described herein (both numbered and unnumbered) as well as their equivalents are also considered.

At 502 the method 500 includes changing a machine condition. In one example the machine condition changed includes, but is not limited to, heading or course of a vehicle. In another example, the machine condition includes, but is not limited to, one or more machine characteristics such as pressure, flow rate, application rate, pitch, yaw, roll, depth or the like. In one example, changing the machine condition 502 includes operating a steering implement of a vehicle (e.g., wheel, levers, dive planes, rudders or the like) to precipitate a change in the machine condition. As the machine condition is changed there is a corresponding rate of change of the machine condition as the machine is moved from an initial condition.

At 504, a non-visual increment notification of change of the machine condition is generated. In the example, the non-visual increment notification is generated based on a rate of change of the machine condition. The method 500 includes at 506, sensing the rate of change of the machine condition. For instance the machine condition sensor 102 measures a change in the direction of a vehicle by way of a change in course or heading. A controller, such as the notification generation controller 104, determines the rate of change of that condition. In another example, the machine condition sensor 102 directly measures the rate of change of the condition and accordingly conveys the measured rate of change to the notification generation controller 104.

At 508 the sensed rate of change of the machine condition is integrated (e.g., with the integration module 110) to determine a corresponding instantaneous integral of the rate of change. At 510, the instantaneous integral of the rate of change is compared with at least one threshold and at 512 a non-visual increment notification is generated based on the comparison with the at least one threshold.

In another example, the instantaneous integral of the rate of change is compared with two or more thresholds, for instance an upper and a lower threshold. As described herein, depending on the comparison of the instantaneous integral with upper and lower thresholds one or more varying notifications are provided by way of a non-visual notification generator. For instance, where the instantaneous integral of the rate of change is greater than an upper threshold a first non-visual increment notification is provided by way the non-visual notification generator 106. In another example, where the instantaneous integral of the rate of change is less than a lower threshold a differing non-visual increment notification is provided (e.g., a different auditory or haptic notification relative to the first notification). In one example, the differing notifications include one or more notification characteristics that accordingly alter the notification provided by the generator 106. For instance, a single tone, chime, click or pulse is provided with a change of condition in a first direction corresponding to an upper threshold while a second notification characteristic is applied to the notification to accordingly indicate a change of direction in a second direction (e.g., a stutter click, dual chime, dual pulse or the like).

In one example generating the non-visual increment notification is conducted with the notification generation controller 104 in combination with the non-visual notification generator 106 as shown in FIG. 1A. In the example the non-visual notification system 100 includes an integration module 110, a comparator 112 and a notification module 114 as part of the notification generation controller 104. Each of these modules performs the corresponding functions described with regard to the method 500. For instance, the integration module 110 conducts the integrating of the sensed rate of change of the machine condition, the comparator 112 conducts the comparison between the instantaneous integral of the rate of change with one or more thresholds and the notification module 114 generates an instruction (e.g., an alert, signal or the like) to operate the non-visual notification generator 106 based on the comparison done by the comparator 112.

As further shown in FIG. 5, at 514 the instantaneous integral on the rate of is itself changed based on the generation of the non-visual increment notification. That is to say, in one example with the generation of a non-visual notification the instantaneous integral is correspondingly decremented or incremented (depending on the comparison falling above or below the specified threshold). Optionally, the instantaneous integral is changed with a decrement increment module 116 as shown in FIG. 1A. By changing the instantaneous integral of the rate of change duplicate notifications are not provided to the operator. Instead, the instantaneous integral of the rate of change is decreased or increased to accordingly account for the generation of the corresponding notification for the operator. The method 500 is then optionally repeated with the updated instantaneous integral of the rate of change to accordingly determine whether one or more notifications should be generated based on the comparison of the updated instantaneous integral of the rate of change with the one or more thresholds. For instance, with a sufficiently high rate of change a plurality of sounds, chimes, clicks or the like are generated by the non-visual notification generator 106 to accordingly inform the operator of the magnitude of the change of the machine condition.

Several options for the method 500 follow. In one example changing the machine condition 502 includes changing one or more of a vehicle heading or a vehicle course. For instance, as shown in FIG. 4 one or more of a vehicle course or heading is changed as the vehicle deviates and is guided between points 1 through 5 corresponding to a number of direction changes for the vehicle. In another example, changing of the machine condition 502 includes one or more of changing a pitch, yaw, roll, depth, elevation or the like of a machine. In another example, changing the machine condition includes changing one or more of machine characteristics including speed, pressure, flow rate, application rate for of an agricultural product, seeds or the like. The method 500 further includes integrating the rate of change of these exemplary conditions.

In another example changing the instantaneous integral of the rate of change includes decrementing or incrementing the instantaneous integral of the rate of change (for instance with the module 116 shown in FIG. 1A) by a threshold based on a resolution value. For instance an upper threshold value and a lower threshold value are set so the difference between the thresholds is equivalent to a specified resolution value for the measured machine condition. For instance, in one example where the desired resolution of the machine condition is one-third of a degree the corresponding upper and lower thresholds are provided relative to that value. For instance the upper threshold is set at one-sixth of a degree (above zero) and the lower threshold is set at one-sixth of a degree below zero. The difference between the upper and lower thresholds (one-sixth and negative one-sixth of a degree) is the resolution value, one-third of a degree.

As previously described herein, in one example the threshold includes a plurality of thresholds, such as first and second thresholds. Comparing the instantaneous integral of the rate of change with first and second thresholds includes comparing the instantaneous integral with the first threshold corresponding to a first direction of change (for instance to the left or port). Comparing the instantaneous integral of the rate of change with the second threshold corresponds to a second direction of change (to the right or starboard) different than the first direction. Accordingly, by comparing the instantaneous integral of the rate of change with differing thresholds a sense of direction is provided for the change in the machine condition. The non-visual notification provided by the generator 106 is optionally formatted to convey the differing directions (e.g., by way of a notification characteristic).

In another example, incrementing and decrementing the instantaneous integral of the rate of change is performed based on the direction based thresholds (described above) and comparisons using the same. Where the instantaneous integral is compared against first and second differing thresholds based on the resolution value changing the instantaneous integral of the rate of change includes decrementing the instantaneous integral of the rate of change by the resolution value based on the comparison of the instantaneous integral of the rate with the greater of the first or second thresholds. Similarly, incrementing the instantaneous integral of the rate of change by the resolution value is conducted based on the comparison of the instantaneous integral of the rate of change with the lesser of the first or second thresholds. Stated another way, decrementing of the instantaneous integral is provided where the instantaneous integral is greater than the greater of the two thresholds while incrementing is provided where the instantaneous integral is less than the lesser of the two thresholds.

The method 500 further includes associating a notification characteristic, such as a differing sound or vibration pulsed with the notification to provide an indication of direction of the rate of change. For instance, a first sound is associated with the notification according to the comparison of the instantaneous integral of the rate of change with the first threshold (e.g., an upper threshold) and a second sound is associated with the notification according to the comparison of the instantaneous integral of the rate of change with the second threshold (e.g., a lower threshold). By providing a differing auditory or haptic notifications the operator is accordingly informed, by way of feedback (from the non-visual notification generator 106), of the direction of change in the machine condition. Other examples of notification characteristics that are varied to provide additional directional information of a change include, but are not limited to, audible pitch, audible volume, audible repetition, audible location, audible phase, tactile force, tactile repetition or tactile location. Examples of differing notification generators configured to generate non-visual notifications with the notification characteristics described herein are shown in FIGS. 2, 3A and 3B.

The non-visual notification system 100 shown in FIG. 1A, the method 500 for generating non-visual notifications (see FIG. 5), and an example plot of a vehicle using non-visual notification feedback (see FIG. 4) have been described in some detail herein. One prophetic example of a method based on the rate of turn of a vehicle (e.g., heading or course) is provided below to mathematically show one example of the system 100 and the method 500.

For example, integration of rate of turn (ROT) provides an instantaneous integral of the rate of change as a function of time:

$$H = \int ROT \cdot dt \qquad (1)$$

A right turn is indicated according to the following inequality:

$$H > T1 \qquad (2)$$

Accordingly, if H is greater than T1 then an increment indication is provided (e.g., auditory or haptic feedback such as a sound, vibration, or the like) corresponding to a change in heading. Where the threshold T1 (and T2 as described below) are based on a resolution value and the instantaneous integral is decremented (e.g., negative for the right or clockwise turn) according to the desired heading resolution (DH):

$$H = H - DH \qquad (3)$$

Similarly, a left turn is indicated according to the inequality:

$$H < T2 \qquad (4)$$

The instantaneous integral is incremented (e.g., positive for the left or counter-clockwise turn) according to the desired heading resolution:

$$H = H + DH \qquad (5)$$

In this example, the desired heading resolution (DH) corresponds to the difference between the thresholds T1 and T2 (e.g., each of T1 and T2 are optionally one half of the desired heading resolution):

$$DH = T1 - T2 \qquad (6)$$

Figure 6:
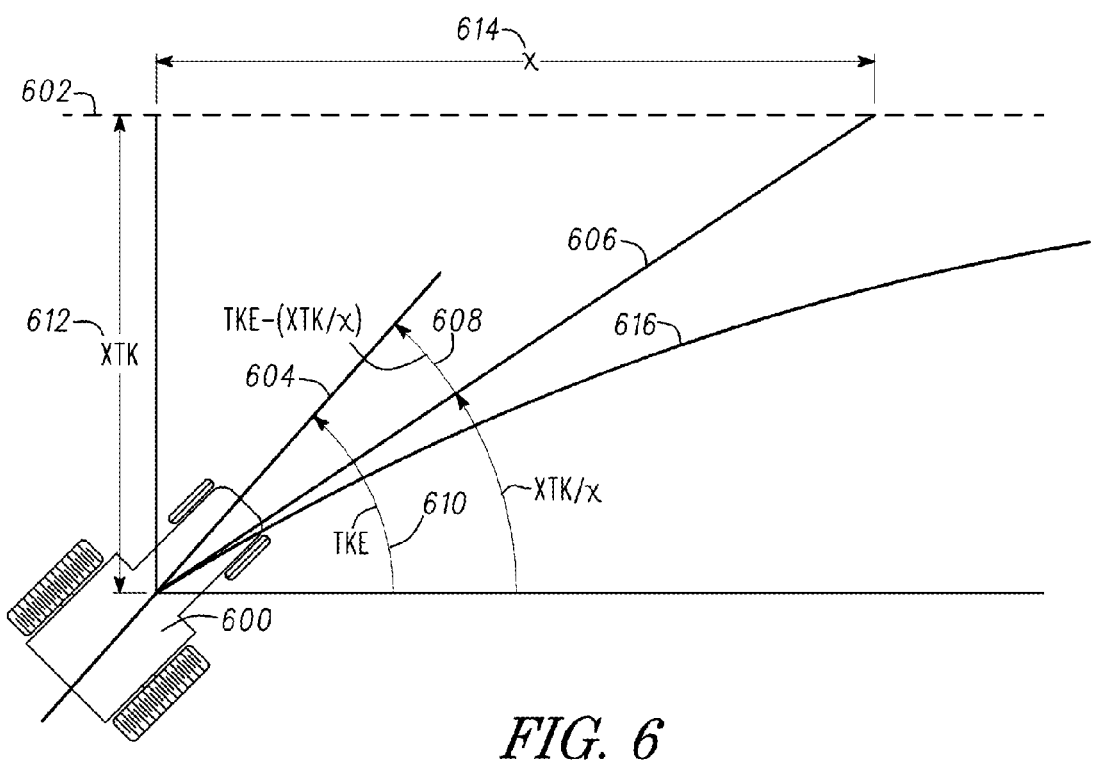
FIG. 6 is a schematic view of a vehicle deviated from and merging with another desired vehicle path according to non-visual notification guidance.

FIG. 6 shows one example of a vehicle 600 guided toward a desired vehicle path 602. Guidance is provided, in one example, with the non-visual notification system 120 previously shown in FIG. 1B. As described herein, the system 120 provides guidance feedback in the form of affirmative non-visual guidance notification to accordingly provide instructions to an operator to guide the vehicle 600 toward and onto the desired vehicle path 602. As further described herein, the system 120 uses a steering algorithm in combination with one or more variables to determine guidance directions for the vehicle 600. The variables include, but are not limited to, a lateral offset of the vehicle 600 relative to the desired vehicle path 602, a track angle error 610 (corresponding to a vehicle direction of travel 604 relative to the desired vehicle path 602) or the like. The non-visual notification system 120 and the methods described herein facilitate the guidance of an operator or vehicle (in the example of a vehicle guided by automated steering) toward a guidance direction (e.g., a vector, scaler or the like) with non-visual notification feedback.

Steering algorithms provided and used with the methods described herein (e.g., in the steering algorithm module 124 shown in FIG. 1B) provide one or more equations including constants or the like therein that generate guidance directions to facilitate turning the vehicle 600 onto the desired vehicle path 602 in an aggressive or relaxed manner depending on the steering algorithm used. The non-visual notification system 120 uses the guidance direction determined in combination with the steering algorithm as well as the deviation of the vehicle 600 to accordingly generate one or more non-visual notifications (for instance with the non-visual notification generator 106) to guide the operator toward a guidance direction 606. The guidance direction 606 (when implemented through directional changes to the vehicle) guides the vehicle to the desired vehicle path 602.

Referring again to FIG. 6, the vehicle 600 in this example is a tractor deviated from the desired vehicle path 602. For instance, the vehicle 600 is laterally offset 612 (corresponding to an across track distance) relative to the desired vehicle path 602. In one example, the lateral offset 612 corresponds to an orthogonal distance from the desired vehicle path 602 to the vehicle 600. Further the vehicle 600 is shown with a track angle error 610 relative to the desired vehicle path 602. As shown in FIG. 6, the track angle error 610 is measured from the vehicle direction of travel 604 (e.g., a present heading or course) relative to an axis that is parallel to the desired vehicle path 602. Although a terrestrial vehicle is shown in FIG. 6 the vehicle 600 includes, in other examples, one or more of terrestrial, nautical and airborne vehicles.

In other examples, the guidance direction 606, although provided as a vector or scaler quantity extending away from the vehicle 600, is in another example a guidance direction corresponding to a changed machine condition of the vehicle 600 including, but not limited to, heading, course, pitch, yaw, depth, roll, speed, pressure, application rate of an agricultural product or seeds or the like. That is to say, the methods described herein and implemented for instance by way of the non-visual notification system 120 are not limited to a steering configuration. For instance the steering algorithm module 124 is in one example an algorithm module configured to retain an algorithm therein that guides the operator of a machine or the automated control of a machine toward a desired machine condition. Accordingly, with deviation of the machine from the desired machine condition the algorithm along with values corresponding to the deviation of the machine condition provide a guidance direction 606 (when implemented with the non-visual notifications described herein) guides the machine toward the desired machine condition.

In the example shown in FIG. 6, a linear vehicle path 602 is provided. In other examples, the desired vehicle path 602 is a nonlinear path for instance a curved or partially curved path corresponding to rows of a field. Such an exemplary vehicle path 602 includes curved portions, linear portions and the like. In another example the desired vehicle path 602 includes a route along a road, a route across country, one or more of aeronautical preset flight paths, a nautical course or the like. Accordingly, for the purposes of this example the desired vehicle path 602 is provided as a linear vehicle path for ease of description. However in other examples the desired vehicle path 602 includes a nonlinear path including one or more of linear portions and nonlinear portions.

Referring again to FIG. 6 the vehicle 600 is shown deviated from the desired vehicle path 602. The vehicle 600 deviates from the desired vehicle path 602 according to the lateral offset 612 corresponding in one example to an across track distance (XTK). Further the vehicle 600 deviates from the desired vehicle path 602 in an angular fashion, for instance according to a vehicle direction of travel 604 relative to the desired vehicle path 602 (in this example an axis extending from the vehicle 600 parallel to the desired vehicle path 602) also called track angle error 610 (TKE). The deviation of the vehicle 600 (e.g., based on the lateral offset 612 and the track angle error 610) are used in a steering algorithm to accordingly provide the guidance direction 606 for the vehicle 600.

In one example, the steering algorithm includes a guidance constant 614 corresponding to the Greek letter x. The steering algorithm (including the guidance constant 614) determines the aggressive or relaxed character of the steering algorithm. Stated another way, the guidance constant 614 serves as one constant of the steering algorithm that determines (at least in part) how quickly the vehicle 600 merges with the desired vehicle path 602. With a smaller guidance constant 614 the vehicle 600 will head toward and merge with the desired vehicle path 602 in an accelerated fashion. In contrast, with a larger guidance constant 614 the vehicle 600 is gradually guided (by way of corresponding guidance direction 606) to the desired vehicle path 602.

As described herein, the guidance direction 606 for the vehicle 600 is determined with the lateral offset 612 and the track angle error 610 (based on the vehicle direction of travel 604 relative to the desired vehicle path 602). In another example, the steering algorithm uses one or more differing deviation characteristics including, but not limited to, the lateral offset 612, the track angle error 610, the speed of the vehicle 600, a varying guidance constant 614 or the like.

Repeated generation of the guidance direction 606 (for varying lateral offsets 612 and track angle errors 610), when followed (e.g., the operator changes heading or course based on non-visual notifications), guides the vehicle 600 on a virtual guidance path 616. The virtual guidance path 616 is an estimation of the route the vehicle 600 will take to merge with the desired vehicle path 602. Guidance directions and accordingly the virtual guidance path 616 vary according to the actual control of the vehicle 600 (e.g., with movement that changes the lateral offset 612 and the track angle error 610).

In one example the guidance direction 606 is determined as a function of the lateral offset 612 of the vehicle 600 relative to the desired vehicle path 602 and the guidance constant 614 (Greek letter $\chi$) as part of an exemplary steering algorithm. That is to say, the guidance direction 606 (GD) corresponds to the lateral offset 612 (XTK, varying with position of the vehicle 600) divided by the guidance constant 614 ($\chi$). The guidance direction 606 extends from the vehicle 600 to the opposed end of the guidance constant 614 extending as a length along the desired vehicle path 602.

$$GD = XTK/\chi \tag{7}$$

Because the guidance direction 606 (GD) varies as a function of lateral offset 612 (XTK) the linear equation for GD will produce trajectories that, close to the path, converge exponentially as shown in the following proportional relationship (where y is equivalent to a varying lateral offset).

$$XTK \propto e^{-y/\chi} \tag{8}$$

The guidance direction is used with the vehicle direction of travel 604 (and the corresponding track angle error 610 (TKE) to find a difference (D) therebetween. The difference 608 between the guidance direction 606 and the vehicle direction of travel 604 corresponds to a course correction or heading correction for the vehicle 600 to achieve the guidance direction determined above.

$$D = TKE - (XTK/\chi) \tag{9}$$

The difference 608 is used by the non-visual notification system 120 to accordingly generate a corresponding non-visual notification. For instance, the difference 608 is used by the notification generation controller 104 to accordingly associate a notification characteristic (with the association module 130) that is delivered to the non-visual notification generator 106 to generate a corresponding non-visual notification that provides affirmative guidance to the operator to facilitate turning of the vehicle 600 from the vehicle direction of travel 604 to the guidance direction 606.

The method for determining the guidance direction is repeated as the vehicle lateral offset 612 and track angle error 610 vary as the vehicle 600 moves relative to the desired vehicle path 602. Accordingly, while an exemplary virtual guidance path 616 is provided in FIG. 6 the guidance path will change with changes in the track angle error 610 and the lateral offset 612 as the vehicle 600 moves (rotationally and translationally) relative to the desired vehicle path 602, for instance into closer proximity with the desired vehicle path 602.

In one example the non-visual notification provided by the non-visual notification system 120 includes an auditory or haptic feedback having one or more varied characteristics to provide an indication to the operator of direction the vehicle 600 should be turned (as a course or heading) to align with the guidance direction 606. In one example an audible non-visual notification includes one or more of variations of audible pitch, audible volume, audible repetition, audible location, phase of a sound are implemented to provide a sense of direction. In a similar manner, a tactile non-visual notification, such as a vibration pulse, includes varying notification characteristics including, but not limited to, variation in tactile force, tactile repetition or tactile location to indicate a direction for the non-visual guidance notifications. See for instance, the generators shown in FIGS. 2, 3A, B.

The guidance direction 606 and the corresponding non-visual notifications that provide affirmative guidance to an operator for instance to transition a vehicle from the vehicle direction of travel 604 toward the guidance direction 606 are determined and generated by the non-visual notification system 120 shown in FIG. 1B. For instance, the desired vehicle path 602 is provided to the system 120 by way of a desired vehicle path module 122. In one example the desired vehicle path module 122 includes (or is an interface with) a field map, a prescribed course, heading or the like, a route through a body of water or over terrain, one or more of a prescribed application rate of an agricultural product, seeds or the like to a field. The deviation of the vehicle 600, for instance the lateral offset 612 and the track angle error 610, are two examples of characteristics used to determine the guidance direction 606. In one example, these characteristics are measured by a location sensor 123 and a machine condition sensor 102. In one example the location sensor 123 provides an indexed location of the vehicle 600 (by way of one or more of a GPS antenna, a local fiducial antenna relative to a static fixed point or the like) corresponding to the lateral offset 612. The machine condition sensor 102 (e.g., one or more gyrocompasses) determines the vehicle direction of travel 604. The machine condition sensor 102 (and the determined vehicle direction of travel 604) in combination with the desired vehicle path 602 are used by the notification generation controller 104 to determine the track angle error 610. The guidance direction module 126 in combination with the steering algorithm module 124) uses these measured values as inputs to generate the guidance directions, such as the guidance direction 606 shown in FIG. 6.

The guidance direction module 126 cooperates with the difference module 128 to determine the difference 608 between the vehicle direction of travel 604 and the guidance direction 606. Based on the difference 608, the association module 130 associates a notification characteristic (e.g., a variable notification characteristic) with a notification for the non-visual notification generator 106 to guide the operator in changing the machine condition (e.g., one or more of heading or course) toward the guidance direction 606. For instance, the notification characteristic provides a direction for the change provided by the notification. IN another example, the notification characteristic provides an indication of urgency (e.g., magnitude) of changing the condition (heading or course) of the vehicle 600 relative to the guidance direction 606. The notification provided by the association module 130 including the notification characteristic is communicated to the non-visual notification generator 106 (one or more speakers, tactile generators such as vibration mechanisms or the like) to accordingly generate a corresponding non-visual notification for the operator that provides affirmative guidance feedback to facilitate an affirmative change of the machine condition (e.g., the course or heading of the vehicle 600) toward the guidance direction 606.

Figure 7:
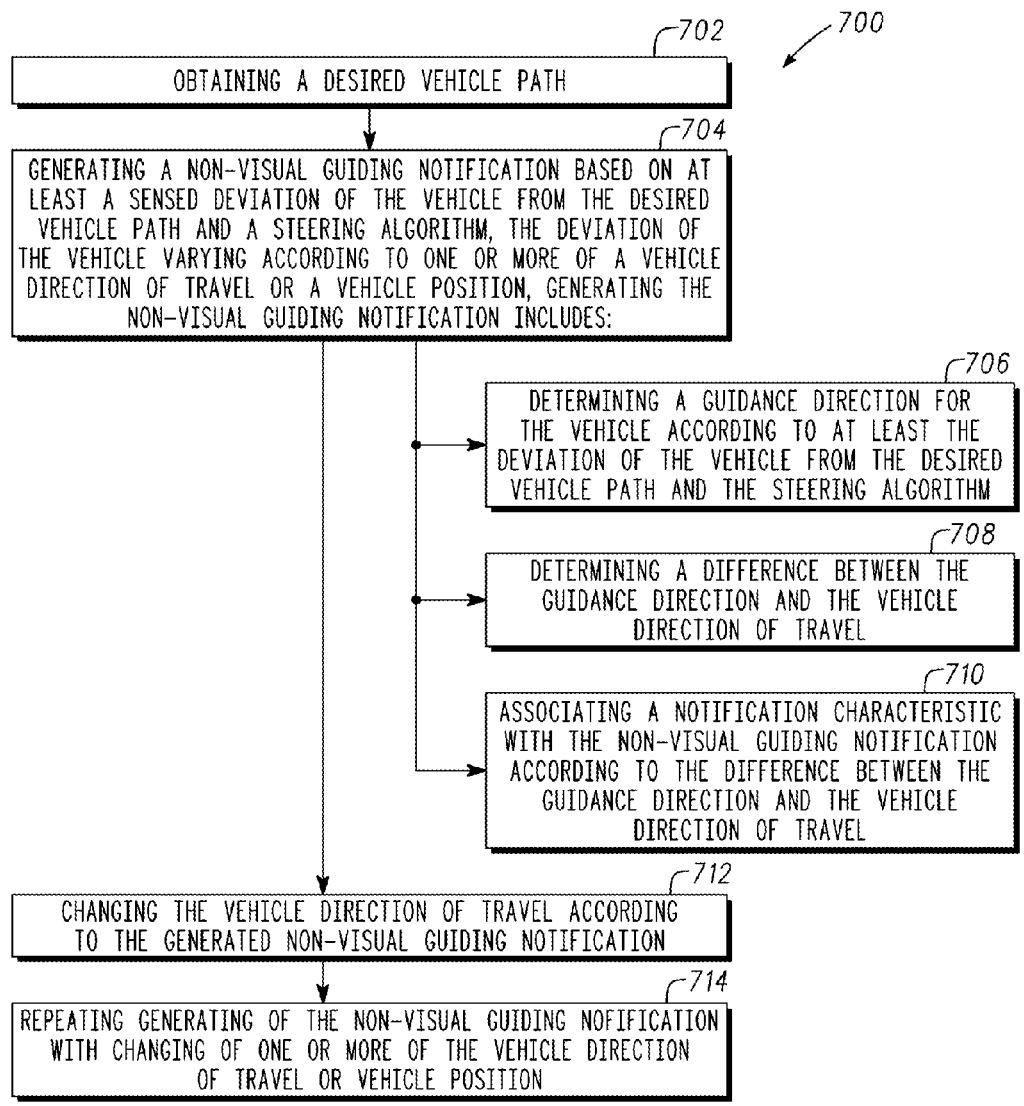
FIG. 7 is a block diagram showing one example of a method for non-visually guiding a vehicle.

One example of a method for non-visually guiding a machine, such as a vehicle 600, is shown in FIG. 7. In describing the method 700 reference is made to one or more components, features, functions and steps previously described herein. Where convenient reference is made to the components, features, steps and the like with reference numerals. Reference numerals provided are exemplary and are nonexclusive. For instance, features, components, functions, steps and the like described in the method 700 include but are not limited to the corresponding numbered elements provided herein. Other corresponding features described herein (both numbered and unnumbered) as well as their equivalents are also considered.

At 702 a desired vehicle path, such as the vehicle path 602 shown in FIG. 6, is obtained. In one example, the desired vehicle path is provided by one or more of an input source including, but not limited to, a touch screen, a field map including a prescribed course or a series of headings, heading changes, course changes and the like, a route along a road, channel or the like or a prescribed application map of an agricultural product or seeds. In one example the desired vehicle path 602 is maintained in a desired vehicle path module 122 as shown in FIG. 1B.

At 704 a non-visual guiding notification is generated. The non-visual guiding notification is based on at least a sensed deviation of the vehicle such as the vehicle 600 (FIG. 6) from the desired vehicle path 602 and a steering algorithm. The deviation of the vehicle 600 varies according to the vehicle direction of travel 604 (for instance the vehicle direction of travel 604 changes as the vehicle 600 moves translationally and rotationally and approaches or deviates further from the desired vehicle path 602).

In one example at 706 generating the non-visual guiding notification includes determining a guidance direction 606 for the vehicle 600 according to at least the deviation of the vehicle 600 from the desired vehicle path and a steering algorithm (e.g., maintained optionally in a steering algorithm module 124). For instance, the vehicle 600 is deviated from the desired vehicle path 602 as shown in FIG. 6 by a lateral offset 612 and a track angle error 610 corresponding to the vehicle direction of travel 604 relative to the desired vehicle path 602. The guidance direction 606 is determined as a function of the track angle error 610 and the lateral offset 612 according to the steering algorithm, as shown in FIG. 6. At 708 a difference 608 is determined between the guidance direction 606 and the vehicle direction of travel

604. Accordingly, at a particular position and orientation of the vehicle 600 the guidance direction 606 in combination with the vehicle direction of travel 604 (relative to the desired vehicle path 602) are used with the steering algorithm to determine the difference 608. At 710 a notification characteristic is associated with a non-visual guiding notification according to the difference 608 between the guidance direction 606 and the vehicle direction of travel 604. For instance the notification characteristic is varied according to the difference 608 between the vehicle direction of travel 604 and the guidance direction 606 to optionally provide an indication of direction of change as well as the proscribed magnitude of the change to align with the guidance direction 606.

At 712 with the non-visual guiding notification generated the vehicle direction of travel is changed (by the operator) based on the notification. For instance, the notification provided by the non-visual notification system 120 includes one or more of a direction of change and urgency (e.g., magnitude) of change or the like configured to inform the operator with regard to how the vehicle of direction travel 604 should be changed toward the guidance direction 606. The operator thereafter operates the vehicle 600 to accordingly turn the vehicle 600 toward the guidance direction 606.

The method for generating the non-visual guiding notification is then repeated at 714 as the vehicle direction of travel 604 changes. For instance, as the lateral offset 612 and the track angle error 610 change (components of the vehicle direction of travel 604) the method is repeated to accordingly generate updated non-visual notifications to guide the operator in further operation of the vehicle 600 toward the desired vehicle path 602.

Several options for the method 700 follow. In one example the deviation of the vehicle includes at least the vehicle direction of travel 604 (and corresponding track angle error 610) and a vehicle lateral offset 612 relative to the desired vehicle path 602. In another example determining the guidance direction includes generating the guidance direction 606 as a function of at least the vehicle direction of travel 604, the vehicle lateral offset 612, a vehicle speed and the steering algorithm.

Optionally, the generation of the non-visual guiding notification includes the association of a notification characteristic with a notification that provides an indication of direction, urgency (e.g., magnitude) of a change such as turning or the like. For instance, in one example the non-visual guiding notification includes associating one or more of an audible pitch, audible volume, audible repetition, audible location, audible phase or the like to an audible non-visual notification to provide an indication of direction change, urgency (e.g., magnitude) of the change or the like. In another example, for instance with a tactile non-visual notification, one or more of tactile force, tactile repetition or tactile location as a notification characteristic is provided to a tactile notification such as a vibration pulse or the like to accordingly provide the resulting non-visual guiding notification including a notification characteristic.

In another example, associating the notification characteristic with the non-visual guiding notification includes associating a first directional notification characteristic based on the difference between the guidance direction 606 and the vehicle direction of travel in a first direction 604 for instance to the right or left of the guidance direction 606. Associating a second directional notification characteristic includes associating the second directional notification characteristic based on the difference between the guidance direction 606 and the vehicle direction of travel in a second direction for instance in a direction to the left or right of the guidance direction 606. The first and second directional notification characteristics vary and accordingly provide an indication to the operator which direction the vehicle 600 should be turned to move toward the guidance direction 606.

In another example generating the non-visual guidance notification includes generating sounds from one or more stereo speakers. For instance as previously shown in FIG. 2 and described herein the vehicle cabin 200 includes one or more speakers 210, 212 that accordingly generate sounds such as audible chimes, clicks, repeated audio files or the like to provide feedback to the operator seated in the operator seat 202. Differing sounds are generated, in an example, by each of the speakers 210, 212 to provide an indication of direction or urgency (e.g., magnitude) of change in the machine condition. In another example, each of the speakers 210, 212 (or a single speaker) provide differing sounds to accordingly provide an indication of direction and urgency of the change of the machine condition. In still another, example generating the non-visual guiding notification includes generating haptic notification such as a tactile notification (vibration pulse) in one or more of the steering implement 206 or the floor of the vehicle cabin for instance in one or more vibrating plates 300, 302, as shown in FIG. 3A, B.

VARIOUS NOTES & EXAMPLES

Example 1 can include subject matter such as can include A method for non-visually indicating a change in a machine condition comprising: changing a machine condition; generating a non-visual increment notification of change of the machine condition based on a rate of change of the machine condition, generating the non-visual increment notification including: sensing the rate of change of the machine condition, integrating the sensed rate of change of the machine condition to determine an instantaneous integral of the rate of change, comparing the instantaneous integral of the rate of change with a threshold, and generating the non-visual increment notification based on the comparison; and changing the instantaneous integral of the rate of change based on the generation of the non-visual increment notification.

Example 2 can include, or can optionally be combined with the subject matter of Example 1, to optionally include wherein changing the machine condition includes changing one or more of a vehicle heading or a vehicle course.

Example 3 can include, or can optionally be combined with the subject matter of one or any combination of Examples 1 or 2 to optionally include wherein changing the instantaneous integral of the rate of change includes decrementing or incrementing the instantaneous integral of the rate of change by a resolution value, the threshold for comparing the instantaneous integral of the rate of change based on the resolution value.

Example 4 can include, or can optionally be combined with the subject matter of one or any combination of Examples 1-3 to optionally include wherein the threshold includes first and second thresholds and comparing the instantaneous integral of the rate of change with the threshold includes: comparing the instantaneous integral of the rate of change with the first threshold corresponding to a first direction of change, and comparing the instantaneous integral of the rate of change with the second threshold corresponding to a second direction of change different than the first direction.

Example 5 can include, or can optionally be combined with the subject matter of one or any combination of Examples 1-4 to optionally include wherein the first and second thresholds are based on a resolution value for generation of the non-visual increment notification, and changing the instantaneous integral of the rate of change includes: decrementing the instantaneous integral of the rate of change by the resolution value based on the comparison of the instantaneous integral of the rate of change with the greater of the first or second threshold, and incrementing the instantaneous integral of the rate of change by the resolution value based on the comparison of the instantaneous integral of the rate of change with the lesser of the first or second threshold.

Example 6 can include, or can optionally be combined with the subject matter of Examples 1-5 to optionally include wherein generating the non-visual increment notification includes associating a notification characteristic to the non-visual increment notification according to the comparison of the instantaneous integral of the rate of change with the first and second thresholds, the associated notification characteristic indicative of the first or second direction of change.

Example 7 can include, or can optionally be combined with the subject matter of Examples 1-6 to optionally include wherein associating the notification characteristic includes: associating a first sound according to the comparison of the instantaneous integral of the rate of change with the first threshold, and associating a second sound according to the comparison of the instantaneous integral of the rate of change with the second threshold.

Example 8 can include, or can optionally be combined with the subject matter of Examples 1-7 to optionally include confirming achievement of a desired machine condition of the machine condition including: determining a difference value corresponding to a difference between an initial machine condition and the desired machine condition, determining an increment count based on the difference value and a resolution value, the threshold based on the resolution value, and determining the desired machine condition is achieved when a plurality of generated non-visual increment notifications matches the increment count.

Example 9 can include, or can optionally be combined with the subject matter of Examples 1-8 to optionally include a method for non-visually guiding a vehicle comprising: obtaining a desired vehicle path; generating a non-visual guiding notification based on at least a sensed deviation of the vehicle from the desired vehicle path and a steering algorithm, the deviation of the vehicle varying according to one or more of a vehicle direction of travel or a vehicle position, generating the non-visual guiding notification including: determining a guidance direction for the vehicle according to at least the deviation of the vehicle from the desired vehicle path and the steering algorithm, determining a difference between the guidance direction and the vehicle direction of travel, and associating a notification characteristic with the non-visual guiding notification according to the difference between the guidance direction and the vehicle direction of travel; changing the vehicle direction of travel according to the generated non-visual guiding notification; and repeating generating of the non-visual guiding notification with changing of one or more of the vehicle direction of travel or vehicle position.

Example 10 can include, or can optionally be combined with the subject matter of Examples 1-9 to optionally include wherein the deviation of the vehicle includes at least the vehicle direction of travel and a vehicle lateral offset relative to the desired vehicle path, and determining the guidance direction includes generating the guidance direction as a function of at least the vehicle direction of travel, the vehicle lateral offset and the steering algorithm.

Example 11 can include, or can optionally be combined with the subject matter of Examples 1-10 to optionally include wherein determining the guidance direction includes generating the guidance direction as a function of at least the vehicle direction of travel, the vehicle lateral offset, a vehicle speed and the steering algorithm.

Example 12 can include, or can optionally be combined with the subject matter of Examples 1-11 to optionally include wherein associating the notification characteristic with the non-visual guiding notification includes associating one or more of an audible pitch, audible volume, audible repetition, audible location, audible phase, tactile force, tactile repetition or tactile location as the notification characteristic with one or more of a sound or vibration, respectively, as the non-visual guiding notification.

Example 13 can include, or can optionally be combined with the subject matter of Examples 1-12 to optionally include wherein associating the notification characteristic with the non-visual guiding notification includes: associating a first directional notification characteristic based on the difference between the guidance direction and the vehicle direction of travel in a first direction, and associating a second directional notification characteristic based on the difference between the guidance direction and the vehicle direction of travel in a second direction, wherein the first and second directions are different and the first and second directional notification characteristics are different.

Example 14 can include, or can optionally be combined with the subject matter of Examples 1-13 to optionally include wherein generating the non-visual deviation notification includes generating sounds from one or more stereo speakers.

Example 15 can include, or can optionally be combined with the subject matter of Examples 1-14 to optionally include wherein generating the non-visual guiding notification includes generating vibrations in one or more of a steering device or a portion of a cabin.

Example 16 can include, or can optionally be combined with the subject matter of Examples 1-15 to optionally include wherein obtaining the desired vehicle path includes obtaining the desired vehicle path from an input device, a field computer or a remote database.

Example 17 can include, or can optionally be combined with the subject matter of Examples 1-16 to optionally include a system for generating a non-visual notification of a machine condition comprising: a machine condition sensor, the machine condition sensor senses a machine condition; a notification generation controller in communication with the machine condition sensor, the notification generation controller generates a notification according to the sensed machine condition; and a non-visual notification generator in communication with the notification generation controller, the non-visual notification generator generates a non-visual notification based on the notification.

Example 18 can include, or can optionally be combined with the subject matter of Examples 1-17 to optionally include wherein the machine condition sensor includes a rate of change sensor configured to sense the rate of change of a machine condition.

Example 19 can include, or can optionally be combined with the subject matter of Examples 1-18 to optionally include wherein the rate of change sensor includes a rate of change sensor configured to measure a vehicle heading or a vehicle course.

Example 20 can include, or can optionally be combined with the subject matter of Examples 1-19 to optionally include wherein the notification generation controller includes: an integration module, the integration module integrates the sensed rate of change of the machine condition to determine an instantaneous integral of the rate of change, a comparator, the comparator compares the instantaneous integral of the rate of change with a threshold, and a notification module, the notification module generates a notification based on the comparison of the comparator.

Example 21 can include, or can optionally be combined with the subject matter of Examples 1-20 to optionally include wherein the threshold includes first and second thresholds and the comparator includes: a first threshold comparator, the first threshold comparator compares the instantaneous integral of the rate of change with a first threshold corresponding to a first direction of change, and a second threshold comparator, the second threshold comparator compares the instantaneous integral of the rate of change with a second threshold corresponding to a second direction of change different than the first direction.

Example 22 can include, or can optionally be combined with the subject matter of Examples 1-21 to optionally include wherein the non-visual notification generator generates a first non-visual notification according to the comparison of the instantaneous integral of the rate of change with the first threshold, and the non-visual notification generator generates a second non-visual notification according to the comparison of the instantaneous integral of the rate of change with the second threshold, the first and second non-visual notifications are different.

Example 23 can include, or can optionally be combined with the subject matter of Examples 1-22 to optionally include a decrement increment module in communication with the notification generation controller, the decrement increment module: decreases the instantaneous integral of the rage of change according to the generation of the non-visual notification and comparison of the instantaneous integral of the rage of change with the greater of the first and second threshold, and increases the instantaneous integral of the rage of change according to the generation of the non-visual notification and comparison of the instantaneous integral of the rage of change with the greater of the first and second threshold.

Example 24 can include, or can optionally be combined with the subject matter of Examples 1-23 to optionally include wherein the machine condition sensor is a vehicle direction sensor, the vehicle direction sensor senses a vehicle direction of travel.

Example 25 can include, or can optionally be combined with the subject matter of Examples 1-24 to optionally include wherein the vehicle direction sensor includes at least one a heading sensor or a course sensor.

Example 26 can include, or can optionally be combined with the subject matter of Examples 1-25 to optionally include wherein the notification generation controller includes: a guidance direction module, the guidance direction module determines a guidance direction for the vehicle according to at least a deviation of the vehicle from a desired vehicle path and a steering algorithm, a difference module, the difference module determines the difference between the guidance direction and the vehicle direction of travel, and an association module, the association module associates a notification characteristic with the notification according to the difference between the guidance direction and the vehicle direction of travel.

Example 27 can include, or can optionally be combined with the subject matter of Examples 1-26 to optionally include wherein the non-visual notification generator associates one or more of an audible pitch, audible volume, audible repetition, audible location, audible phase, tactile force, tactile repetition or tactile location corresponding to the notification characteristic with one or more of a sound or vibration, respectively, as the non-visual notification.

Example 28 can include, or can optionally be combined with the subject matter of Examples 1-27 to optionally include wherein the notification includes at least first and second notifications, and the notification generation controller: generates a first directional notification based on the difference between the guidance direction and the vehicle direction of travel in a first direction, generates a second directional notification based on the difference between the guidance direction and the vehicle direction of travel in a second direction different from the first direction, and the first and second directional notifications are different.

Example 29 can include, or can optionally be combined with the subject matter of Examples 1-28 to optionally include wherein the machine condition sensor is one or more of a heading sensor or a course sensor.

Example 30 can include, or can optionally be combined with the subject matter of Examples 1-29 to optionally include wherein the non-visual notification generator generates non-visual notifications including one or more of a sound or a vibration.

Example 31 can include, or can optionally be combined with the subject matter of Examples 1-30 to optionally include wherein the non-visual notification generator generates one or more of a first sound and a second sound or a first vibration and a second vibration according to the direction of the sensed machine condition.

Example 32 can include, or can optionally be combined with the subject matter of Examples 1-31 to optionally include wherein the non-visual notification generator associates a notification characteristic with the sound or vibration according to a magnitude of the sensed machine condition.

Example 33 can include, or can optionally be combined with the subject matter of Examples 1-32 to optionally include wherein the non-visual notification generator includes at least one of one or more speakers or one or more vibration generators associated with steering device or a portion of a cabin.

Each of these non-limiting examples stands on its own, or is optionally combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for non-visually guiding a vehicle comprising:
   obtaining a desired vehicle path;
   generating a non-visual guiding notification based on at least a sensed deviation of the vehicle from the desired vehicle path and a steering algorithm, the deviation of the vehicle varying according to one or more of a vehicle direction of travel or a vehicle position, generating the non-visual guiding notification including:
      determining a guidance direction for the vehicle according to at least the deviation of the vehicle from the desired vehicle path and the steering algorithm, determining a difference between the guidance direction and the vehicle direction of travel, and associating a notification characteristic with the non-visual guiding notification according to the difference between the guidance direction and the vehicle direction of travel;
   changing the vehicle direction of travel according to the generated non-visual guiding notification; and
   repeating generating of the non-visual guiding notification with changing of one or more of the vehicle direction of travel or vehicle position; wherein the deviation of the vehicle includes at least the vehicle direction of travel and a vehicle lateral offset relative to the desired vehicle path, and wherein determining the guidance direction includes generating the guidance direction as a function of at least the vehicle direction of travel, the vehicle lateral offset and the steering algorithm.

2. The method of claim 1, wherein associating the notification characteristic with the non-visual guiding notification includes associating one or more of an audible pitch, audible volume, audible repetition, audible location, audible phase, tactile force, tactile repetition or tactile location as the notification characteristic with one or more of a sound or vibration, respectively, as the non-visual guiding notification.

3. The method of claim 1, wherein associating the notification characteristic with the non-visual guiding notification includes:
   associating a first directional notification characteristic based on the difference between the guidance direction and the vehicle direction of travel in a first direction, and associating a second directional notification characteristic based on the difference between the guidance direction and the vehicle direction of travel in a second direction, wherein the first and second directions are different and the first and second directional notification characteristics are different.

4. The method of claim 1, wherein generating the non-visual deviation notification includes generating sounds from one or more stereo speakers.

5. The method of claim 1, wherein generating the non-visual guiding notification includes generating vibrations in one or more of a steering device or a portion of a cabin.

6. The method of claim 1, wherein obtaining the desired vehicle path includes obtaining the desired vehicle path from an input device, a field computer or a remote database.

* * * * *